United States Patent [19]
Eto

[11] Patent Number: 5,944,133
[45] Date of Patent: Aug. 31, 1999

[54] SNOWMOBILE FRAME

[75] Inventor: Tyochika Eto, Iwata, Japan

[73] Assignee: Yamaha Hatsudoki Kabushiki Kaisha, Iwata, Japan

[21] Appl. No.: 08/788,088

[22] Filed: Jan. 22, 1997

[30] Foreign Application Priority Data

Jan. 22, 1996 [JP] Japan ..................... 8-008749

[51] Int. Cl.⁶ .............................. B62M 27/02
[52] U.S. Cl. ........................... 180/190; 180/312
[58] Field of Search .................... 180/182, 184, 180/186, 190, 191, 192, 193, 311, 312, 68.4, 68.6; 280/781

[56] References Cited

U.S. PATENT DOCUMENTS

| | | | |
|---|---|---|---|
| 3,835,948 | 9/1974 | Duclo ........................... | 180/68.4 |
| 3,901,335 | 8/1975 | Johnson ........................ | 180/68.4 |
| 4,887,687 | 12/1989 | Asai et al. .................... | 180/219 |
| 5,167,294 | 12/1992 | Gessinger ...................... | 180/190 |
| 5,232,066 | 8/1993 | Schnelker ...................... | 180/68.4 |
| 5,251,718 | 10/1993 | Inagawa et al. ................. | 180/190 |
| 5,586,614 | 12/1996 | Kouchi et al. .................. | 180/190 |
| 5,660,245 | 8/1997 | Marier et al. .................. | 180/190 |

*Primary Examiner*—Kevin Hurley
*Attorney, Agent, or Firm*—Knobbe, Martens, Olson & Bear LLP

[57] ABSTRACT

A snowmobile having a lightweight fabricated frame assembly. The frame assembly includes a number of reinforcing elements, some of which comprise heat exchangers for the liquid cooling system of the engine, so as to provide high rigidity and light weight. The engine of the snowmobile is provided with an exhaust system that permits a relatively short effective length, but minimizes pulse-back effects by forming internal expansion chambers around the exhaust branch pipes. The drive for the snowmobile includes a reversing transmission and a brake assembly associated therewith in addition to a main brake assembly for the snowmobile. Furthermore, there is provided a parking brake assembly that is easy to operate and which will provide the operator with a visual and physical warning of its condition so that the operator will not attempt to operate the snowmobile with the parking brake engaged.

14 Claims, 24 Drawing Sheets

SNOWMOBILE FRAME

BACKGROUND OF THE INVENTION

This invention relates to a frame for a vehicle such as a snowmobile and more particularly to an improved fabricated frame structure for such vehicles.

In snowmobiles and particularly the larger versions of snowmobiles, the frame assembly is generally comprised of two main frame subassemblies. The first is a comprised primarily of generally inverted U-shaped sheet metal member that supports the seat of the snowmobile on its upper surface and which encloses and overlies the drive belt. A front frame subassembly is generally made up of a pair of side plates that are reinforced by a plurality of box-shaped cross members that extend between the side plates. The engine, the front skis and steering mechanism are all carried by this front frame assembly.

Because of the construction, it is necessary to locate the cross members in such a way that they are either detachable or will clear the engine and other components supported thereby. This frequently results in sacrifices in strength and rigidity.

More importantly, however, the aforenoted type of front frame subassembly requires considerable manual labor for fabrication and assembly. A wide variety of welds or rivets or other fasteners are required to secure all of the components together, some of which must be detachable for service purposes.

It is, therefore, a principal object of this invention to provide an improved front frame assembly for a snowmobile.

It is a further object of this invention to provide a simplified yet highly rigid front frame assembly for a snowmobile that can be easily and economically manufactured and fabricated.

SUMMARY OF THE INVENTION

This invention is adapted to be adapted in a frame assembly for a snowmobile or the like which is comprised of a U-shaped sheet metal assembly having a pair of vertically-extending spaced apart side wall portions joined at one end by a horizontally extending joining portion. A bulkhead formed from an alloy casting spans the side walls and is rigidly affixed thereto.

DETAILED DESCRIPTION OF THE PREFERRED EMBODIMENTS OF THE INVENTION

The Overall Snowmobile

Figure 1:
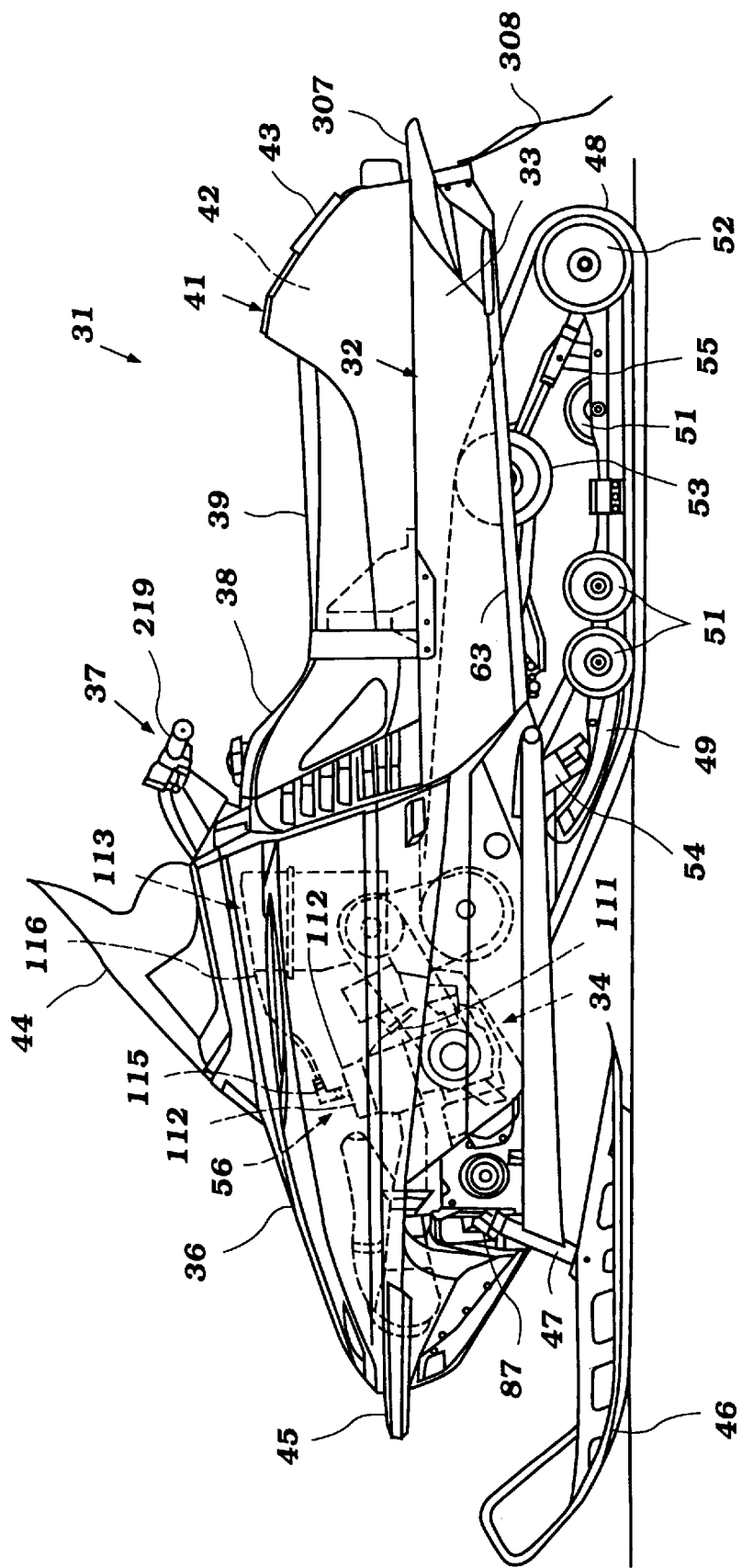
FIG. 1 is a side elevational view of a snowmobile constructed in accordance with the invention.
Figure 2:
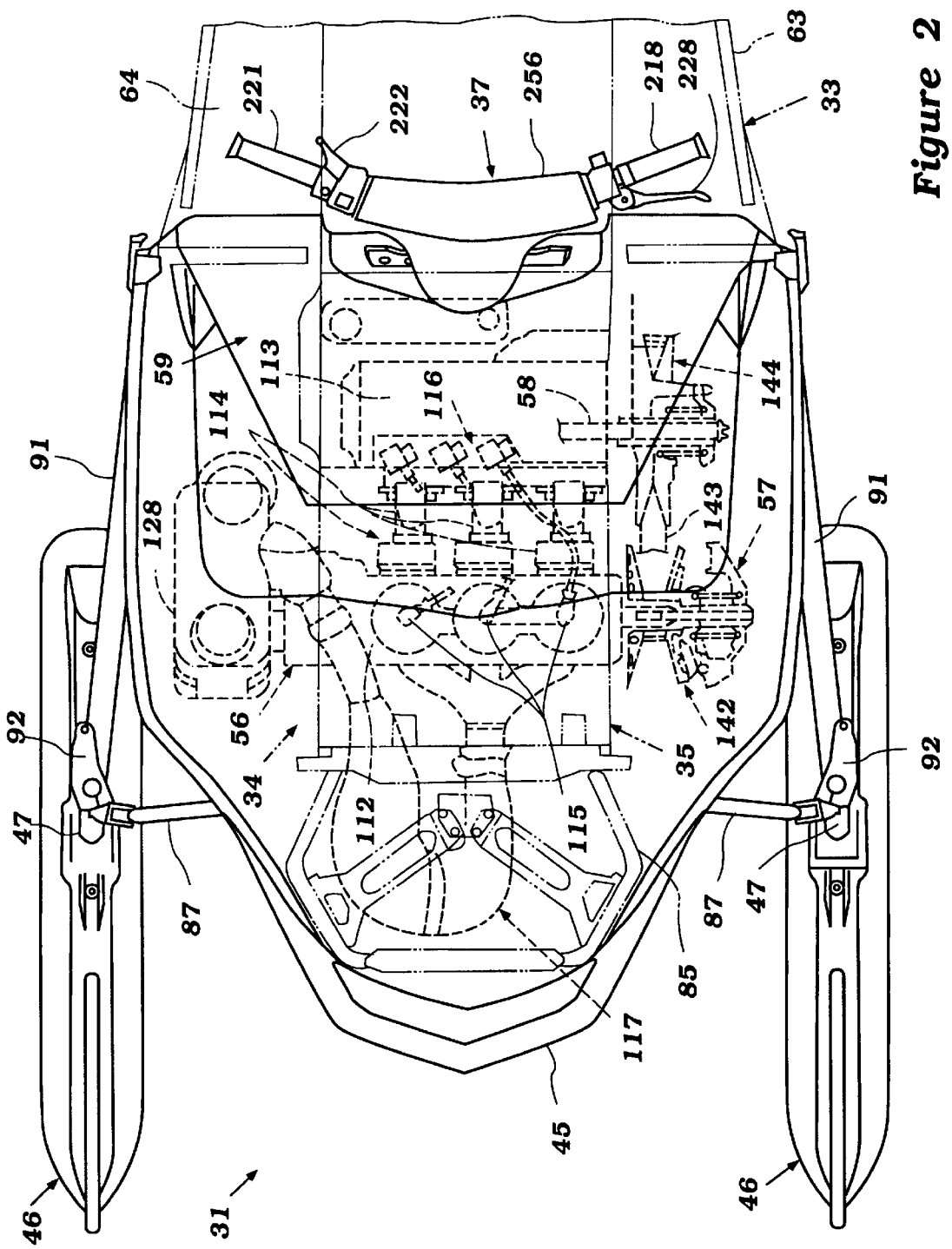
FIG. 2 is an enlarged top plan view showing the forward portion of the snowmobile.
Figure 3:
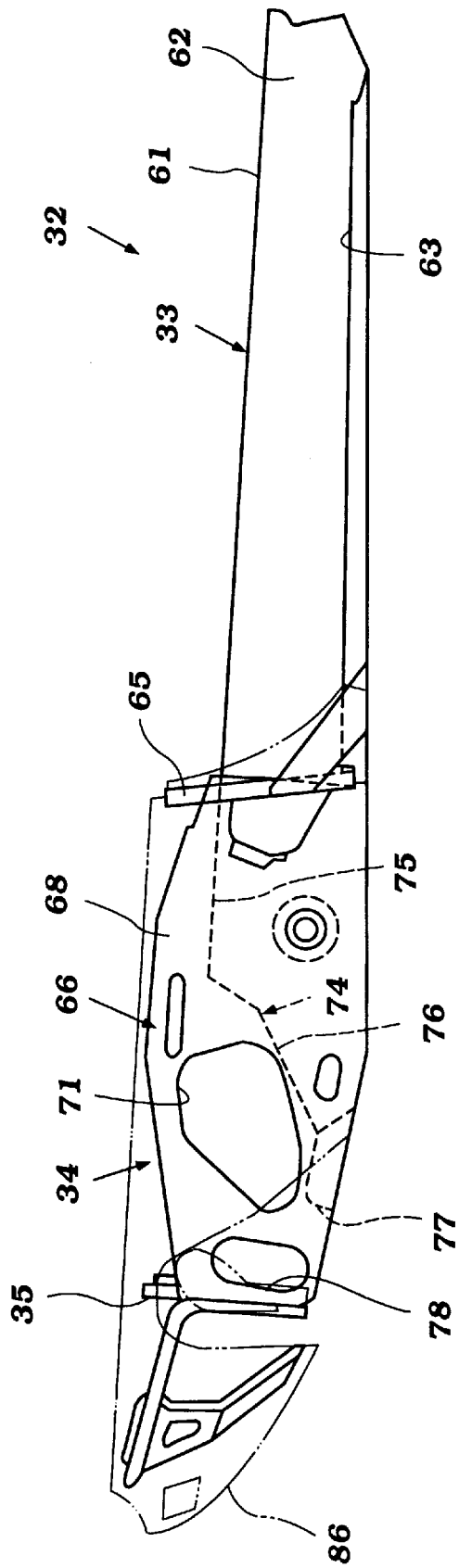
FIG. 3 is a side elevational view of the frame assembly for the snowmobile on a slightly larger scale than that of FIG. 1.

Referring now in detail initially to FIGS. 1 and 2, a snowmobile constructed in accordance with an embodiment of the invention is identified generally by the reference numeral 31. Although the invention relates to a frame assembly for a vehicle, a snowmobile is depicted as a typical environment in which the invention may be practiced. This is a typical environment because the invention has particular utility with frames of the type generally used with snowmobiles.

The snowmobile 31 is comprised of a frame assembly, indicated generally by the reference numeral 32. This frame assembly will be described later in more detail by particular reference to FIGS. 3–9. However, the frame assembly 32 is comprised primarily of a fabricated rear frame subassembly 33, and a fabricated front frame subassembly, indicated generally by the reference numeral 34. The front frame assembly 34 includes a cast bulkhead 35 having a construction which will also be described later by reference to FIGS. 3–9 and specifically to FIGS. 8 and 9.

A body cowling 36 is mounted over the forward portion of the front frame assembly 34 and cooperates with the rear frame assembly 33 so as to form a rider's area to the rear of a controlling handlebar assembly 37. Directly to the rear of the handlebar assembly 37 there is positioned a fuel tank 38 and a rider's seat 39 is disposed to the rear of this fuel tank. The area to the rear of the rider's seat 39 is partially elevated at 41 so as to form a rear storage compartment 42 that is accessible through an openable closure 43.

The body assembly 36 further includes a cowling or windshield 44 disposed to the front of the handlebar assembly 37 in protecting relationship to the rider or riders. A front bumper 45 is affixed to the front of the body 36 via the frame assembly 32 in a manner which will also be described.

A pair of front skis 46 are supported for suspension and dirigible movement at the front of the snowmobile 31 and specifically by the front frame assembly 34 in a manner which also will be described in more detail later. Basically, these skis 46 are supported within tubular members 47 by a suspension system which will be described and which tubular members 47 permit steering movement of the skis 46 under control of the handlebar assembly 37. As noted, this construction will be described in more detail later.

A drive belt 48 is supported at the rear of the snowmobile 31 beneath the seat 39 and specifically beneath an inverted U-shape portion of the rear frame subassembly 33. This drive belt assembly 48 is supported at its lower surface by a pair of guide rails 49 that carry a plurality of idler rollers 51 and a main rear idler roller 52.

An idler roller 53 is mounted by the frame assembly and also cooperates to form the path for the drive belt 48. The drive belt 48 is supported from the frame assembly 32 by a suitable suspension system which may be of any known type. This includes a front linkage 54 and associated cushioning unit (not shown). A rear linkage assembly 55 and additional cushion unit which is also not shown supports the rear end of the guide rails 49 and the drive belt 48.

Since the invention does not deal with the details of the suspension system for either the front skis 46 other than how they are carried by the front frame subassembly 34 or the drive belt 48, where any details of these suspensions systems are not illustrated or described, any conventional structure may be utilized as should be readily apparent to those skilled in the art.

An internal combustion engine, indicated generally by the reference number 56 is mounted in the frame assembly 32 and specifically the front frame subassembly 34 in a manner which will be described. The engine 56 is of the three-cylinder in-line liquid cooled type and operates on a two-stroke crankcase compression principle.

The engine 56 drives the drive belt 48 in a manner which will be described. However, this drive assembly includes a continuously variable belt-type transmission, indicated generally by the reference numeral 57 which is placed on the left-hand side of the is snowmobile 31 as viewed by a seated operator. This drive belt assembly 57 drives an intermediate shaft 58 which is journaled in the frame assembly 32 in a manner which also will be described. A final drive 59 that includes a reversing transmission drives the drive belt 48 through a drive belt shaft, to be described later along with the reversing transmission by particular reference to FIGS. 13–15.

The Frame Assembly

The construction of the frame assembly 32 will now be described by particular reference to FIGS. 3–9. As has been previously noted, the frame assembly 32 is made up of two primary frame subassemblies comprised of a rear frame subassembly 33 and a front frame subassembly 34.

The rear frame subassembly 33 is comprised of a pressing or stamping made from a sheet metal, such as steel, aluminum or aluminum alloy. It has a generally inverted U-shaped configuration that consists of a horizontally extending planar upper portion 61 upon which the seat 39 is supported. The upper portion has a pair of depending side portions 62, each of which has an outwardly extending portion 63 and 64 that form foot areas for accommodating the feet of a seated rider. These foot areas 63 and 64 are generally coextensive in length with the seat 39 and extend rearwardly beyond the rear portion of the seat 39 to lie along the outer sides of the storage compartment 42.

At its forward end, the rear frame subassembly 33 is formed with an outstanding flange portion 65 which is adapted to nest around the forward frame subassembly 34 and be affixed to it as by welding, riveting, or a combination thereof. By so forming the rear frame subassembly 33, the connection can be very robust and encompass a large surface area. In addition, since there are no bent flanges, the strength of the assembly is increased.

The front frame subassembly 34 is also constructed primarily from a sheet metal pressing, indicated generally by the reference numeral 66 and which has a U-shaped configuration that is comprised of a lower wall part 67 extends generally horizontally, although it has a pair of angularly related portions. A pair of upstanding side walls 68 and 69 are formed integrally with this lower wall 67.

The side wall 68 is formed with a generally oval-shaped opening 71 which aligned with the engine 56 and which facilitates passage therethrough a portion of the engine and drive train, as will become apparent.

The opposing side wall 69 is formed with a slotted opening 72 which extends through its upper peripheral edge and which is sized so as to facilitate insertion of the engine between the side members 68 and 69. The upper end of the opening 72 is closed by a closure plate 73 once the engine is in place. This closure plate 73 is detachably connected to the side wall 69, as by threaded fasteners or the like. By closing the opening 72, the side wall 69 is reinforced and, yet, the engine 56 can be easily installed and removed.

An intermediate reinforcing member, indicated generally by the reference numeral 74, extends between the side walls 68 and 69, and has flange portions that are affixed thereto as by welding, riveting, or a combination thereof. This reinforcing member 74 is comprised of a rear, horizontally extending portion 75 which is generally aligned with the rear frame upper wall portion 61. The portion 75 terminates at its forward end in a downwardly sloped part 76 which forms a cradle into which the engine 56 can be positioned and upon which it can be supported.

A sub frame cross-member 77 extends forwardly of the wall portion 76 and is connected thereto, as well as to the side walls 68 and 69, and the lower wall 67, as by welding, riveting, or the like.

Openings 78 are formed in the forward portions of the side walls 68 and 69, so as to provide lightening of the assembly and access to various components, as will be noted. This is done without reducing the overall strength of the assembly.

Figure 8:
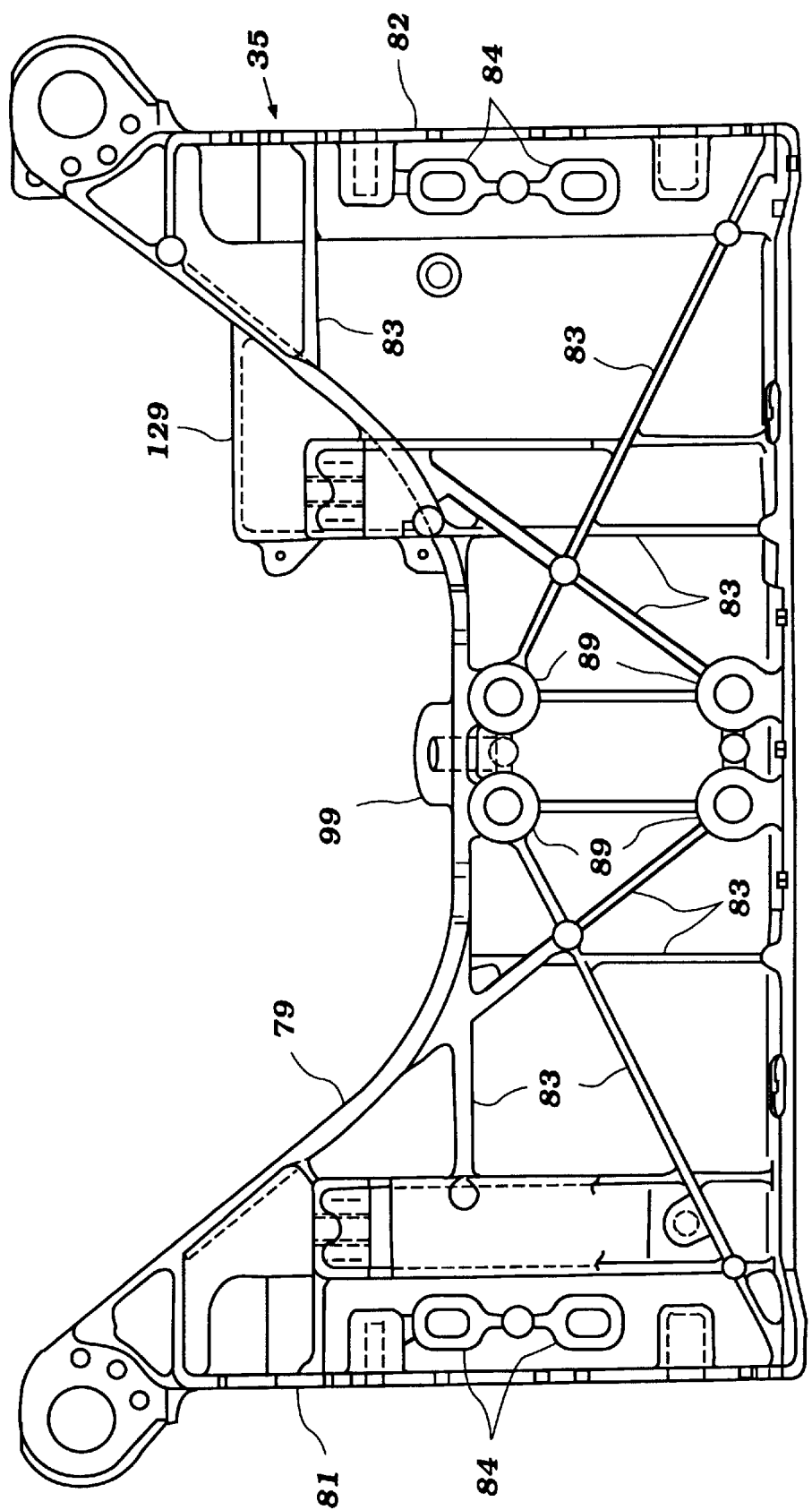
FIG. 8 is an enlarged rear elevational view of the front bulkhead casting for the front frame sub assembly.
Figure 9:
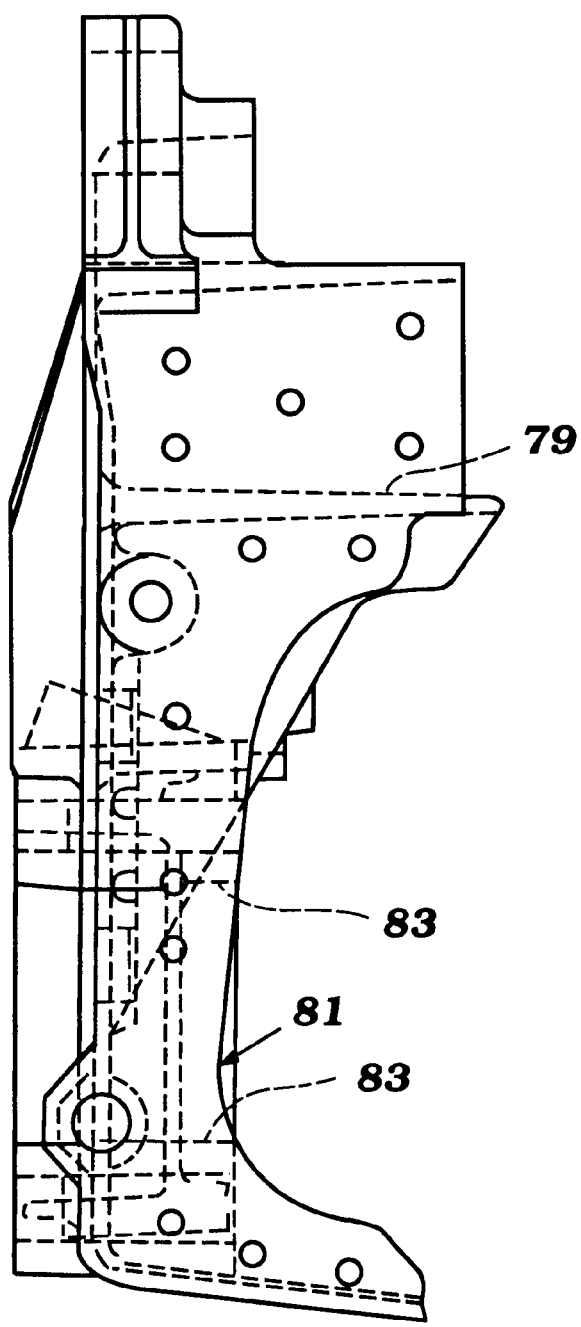
FIG. 9 is a side elevational view of the front frame bulkhead casting.

As has been previously noted, the forward end of the front frame subassembly 34 is closed by a bulkhead, indicated generally by the reference numeral 35. This bulkhead 35 has a configuration as best seen in FIGS. 8 and 9.

The bulkhead 35 is formed primarily as a casting from aluminum or aluminum alloy. The upper surface of the bulkhead 35 is provided with an arcuate recess 79 that is defined by a U-shaped wall portion thereof. The U shaped recess is provided to clear the exhaust system, as will be described later.

This U-shaped wall portion 79 is bounded by a pair of outer side walls 81 and 82, along which the forward sides of the side walls 68 and 69 nest. These forward portions of the side walls 68 and 69 can thus be affixed directly to the bulkhead 35 by riveting, welding, or a combination thereof. Alternatively, threaded fasteners may be utilized. In any of the these events, the structure provides a very good reinforcing and, again, because the joint is formed by planar surfaces, there will be no local stress risers that could weaken the overall construction.

These bulkhead side walls 81 and 82 have curved surfaces and the rear face of the bulkhead 35 is provided with a plurality of reinforcing ribs 83 that run diagonally thereacross so as to add to the rigidity of the structure without significantly increasing its weight. Also, since the ribs 83 extend on the rear side of the bulkhead 35, they will not be subject to the accumulation of foreign material as if they had faced forwardly. The ribs 83 are formed on the protected side of the bulkhead 35 and, thus, will be able to kept fairly clean by their own internal construction. That is, the ribs 83, by being formed on the rear side of the bulkhead, will not be subject to collection of debris as if they were forwardly facing.

The sides of the bulkhead 35 are provided with a pair of embossments 84 that are adapted to receive threaded fasteners for affixing a bumper sub frame 85 thereto. This bumper sub frame 85 appears in most detail in FIGS. 2 and 3, and permits the front bumper 45 to be attached directly thereto around an intervening lower portion 86 of the body 36. Hence, the bumper 45 will be very robust and any forces exerted thereto will be transmitted directly to the frame assembly 32.

The Front Suspension

Figure 4:
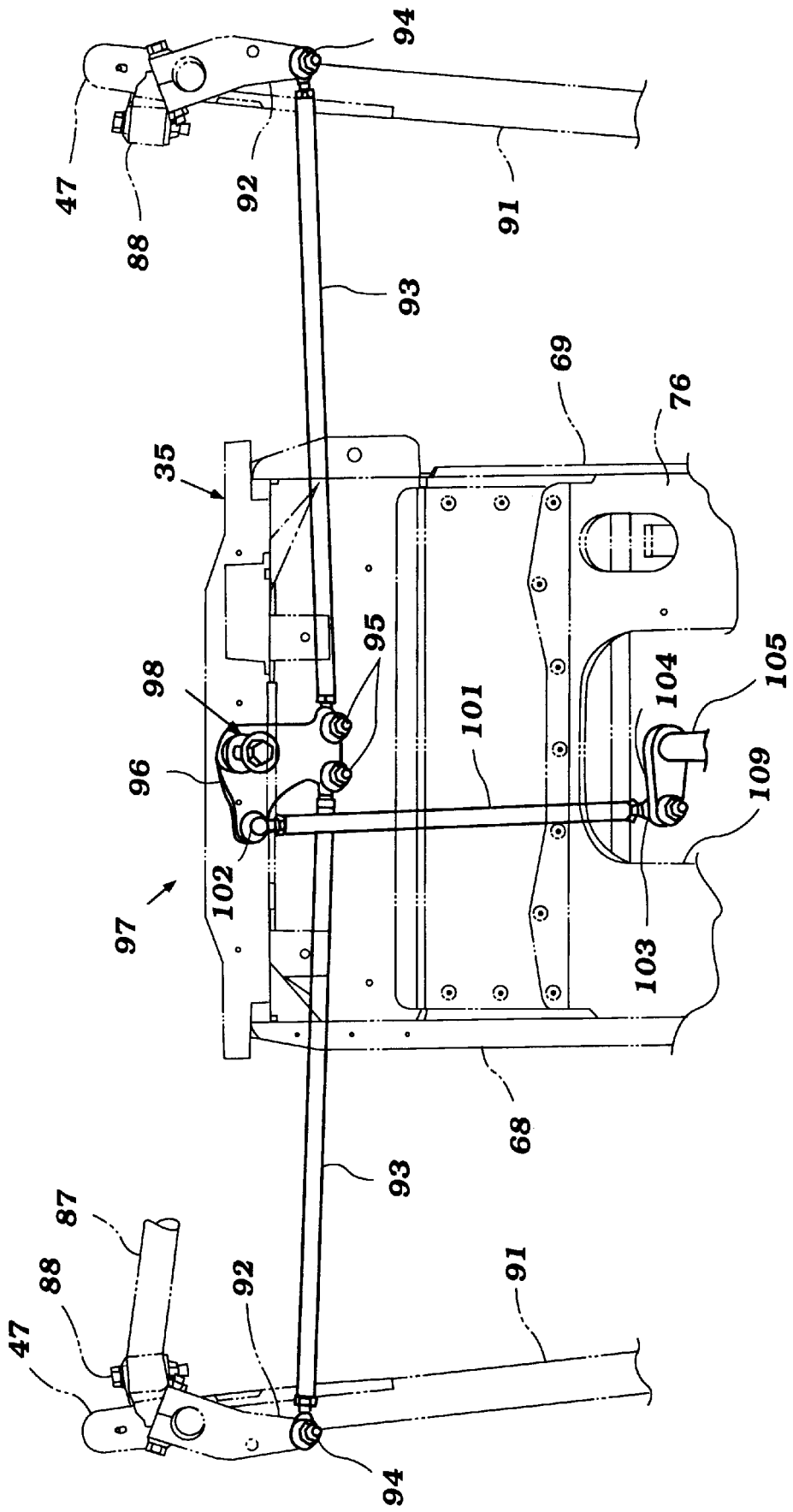
FIG. 4 is a top plan view, in part similar to FIG. 2, but with the snowmobile body broken away and portions of the frame shown in section so as to illustrate a portion of the steering mechanism for the front skis.
Figure 5:
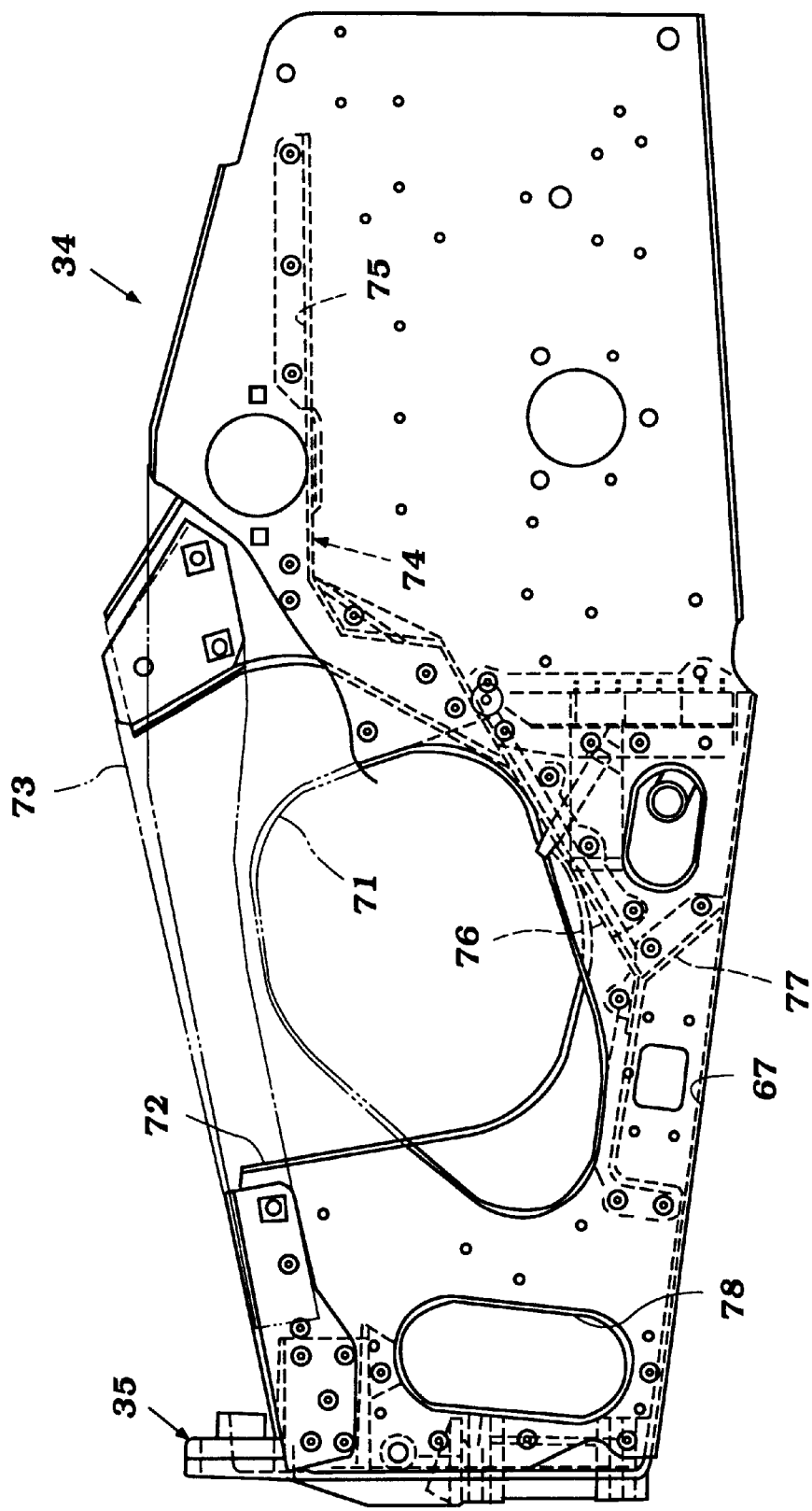
FIG. 5 is an enlarged side elevational view looking in the same direction of FIG. 3, but showing only the front portion of the frame.
Figure 6:
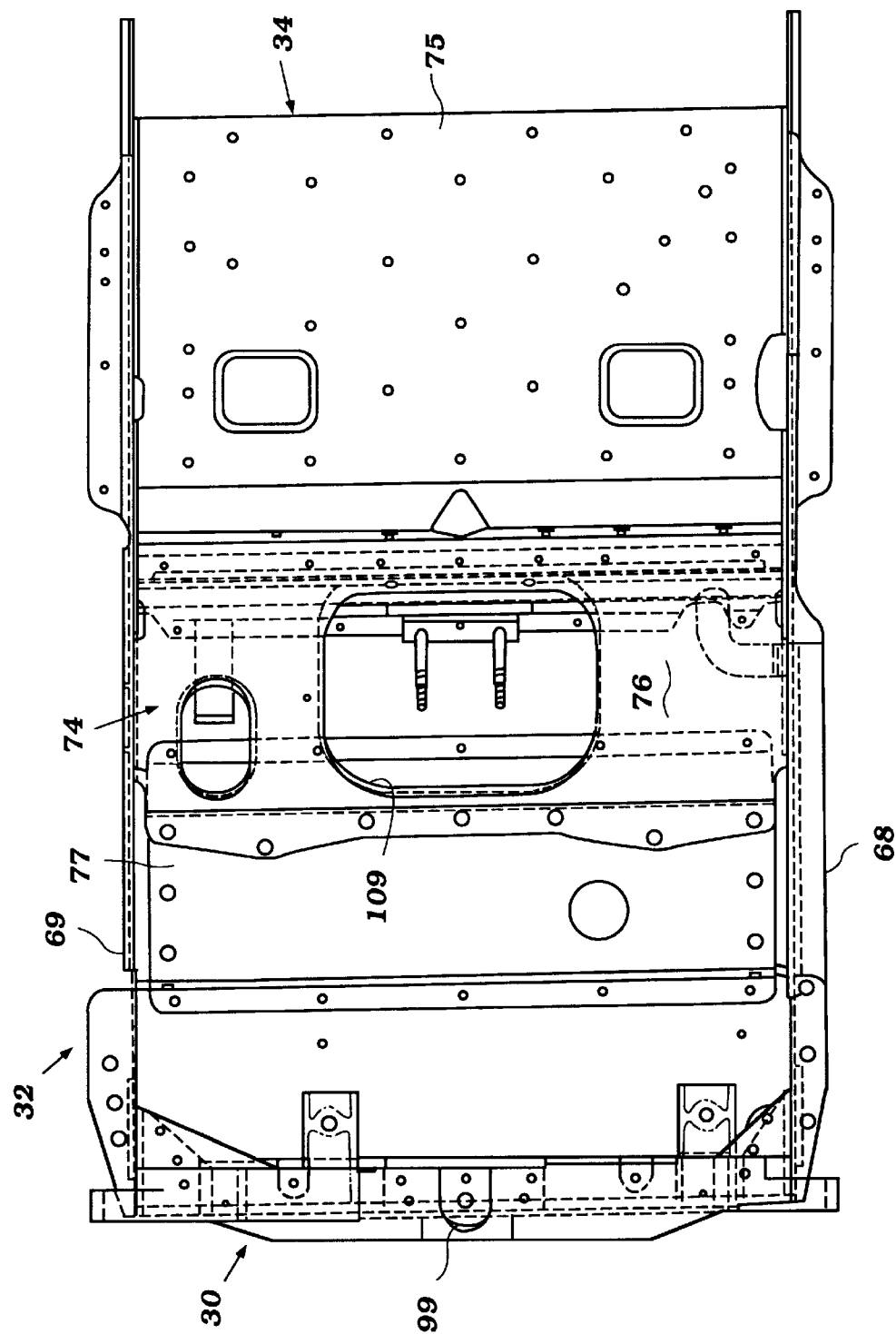
FIG. 6 is a top plan view of the front frame portion on the same scale as FIG. 5.

The suspension arrangement for the front skis 46 and for the steering thereof will now be described by primary reference to FIGS. 2, 4 and 7. The front skis 46, as has been noted, are supported for steering movement by means a pair of tubes 47. These tubes 47 are supported for suspension travel by a pair of suspension arms 87 which have a jointed connection 88 to the tubular member 49 at their outer ends. The inner ends of these suspension arms 87 are pivotally supported on the bulkhead 35 by a pivotal support structure which is not shown, but which is affixed to the bulkhead 35 by means of bosses 89 (FIG. 8) formed in the bulkhead assembly 35 and reinforced by the ribs 83.

In addition to the suspension arms 87, trailing arms 91 are affixed at their forward ends to the tubular members 47. The rear ends of the trailing arms 91 are pivotally connected to the frame assembly and specifically to the rear portion of the front frame subassembly 34 in known manner.

The upper ends of the pins which support the skis 46 for steering movement in the tubular members 47 have connected to them steering arms 92. These steering arms 92 are controlled by tie rods 93 that have hime joints 94 at their outer ends for pivotal connection to the steering arms 92. The inner ends of the tie rods 93 are connected by further hime joints 95 to a bell crank assembly 96 of the steering mechanism, indicated generally by the reference numeral 97. The steering bell crank 96 is pivotally supported on a pivot shaft 98 which is affixed to a boss 99 (FIGS. 6 and 8) of the bulkhead 35 at the center of the recess 79.

A drag link 101 is connected by a hime joint 102 to the bell crank 96 at its forward end. The rear end of the drag link 101 is connected by a further hime joint 103 to a pivot arm 104 that is affixed to the lower end of a steering shaft 105. The lower end of the steering shaft 105 is journaled in a bearing assembly 106 that is mounted to the frame assembly 34 in a manner which will be described later. The upper end of the steering shaft 105 is journaled by a further bearing 107 that is mounted on an extension 108 of the frame assembly. The handlebar assembly 37 is affixed to the upper end of the steering shaft 105 in a known manner for steering of the front skis 46.

It should be noted that the frame member 74 and specifically its inclined portion 76 is formed with an enlarged opening 109 through which the steering mechanism can be readily accessed.

The Engine and Exhaust System

A portion of the construction of the engine 56 will now be described by primary reference to FIGS. 1 and 2. As has been noted, the engine 56 is, in the illustrated embodiment, of the three-cylinder in-line type and operates on a two-stroke crankcase compression principle. The engine 56 is also liquid cooled, as has been noted, and is comprised of a cylinder block 111 which extends generally transversely across the frame assembly 32 as has been previously described. This engine cylinder block 111 is supported by suitable engine mounts in the cradle formed by the front frame subassembly 34 and specifically by the frame members 74 and 77. The cylinder block 111 is formed with three transversely aligned cylinder bores that are closed by a cylinder head assembly 112 that is affixed to the upper end of the cylinder block 111 in any well-known manner.

An air box 113 is mounted in the rear portion of the front frame subassembly 34 and is covered by the body cover 36. This air box 113 delivers air to charge formers 114 which may be comprised of carburetors that serve intake ports of the engine through short connecting manifolds.

The charge thus formed is delivered to the crankcase chambers of the engine for compression and transfer through scavenge passages to the combustion chambers of the engine. This charge is then fired by spark plugs 115 that are mounted in the cylinder head assembly 112. The spark plugs 115 are fired by a spark control box 116 that is conveniently mounted on the upper portion of the air box 113 so as to be cooled by the air flow therethrough.

The charge which is exhausted from the combustion chambers through exhaust ports formed in the front of the cylinder block 111 and delivered to an exhaust system, indicated generally by the reference numeral 117.

Figure 10:
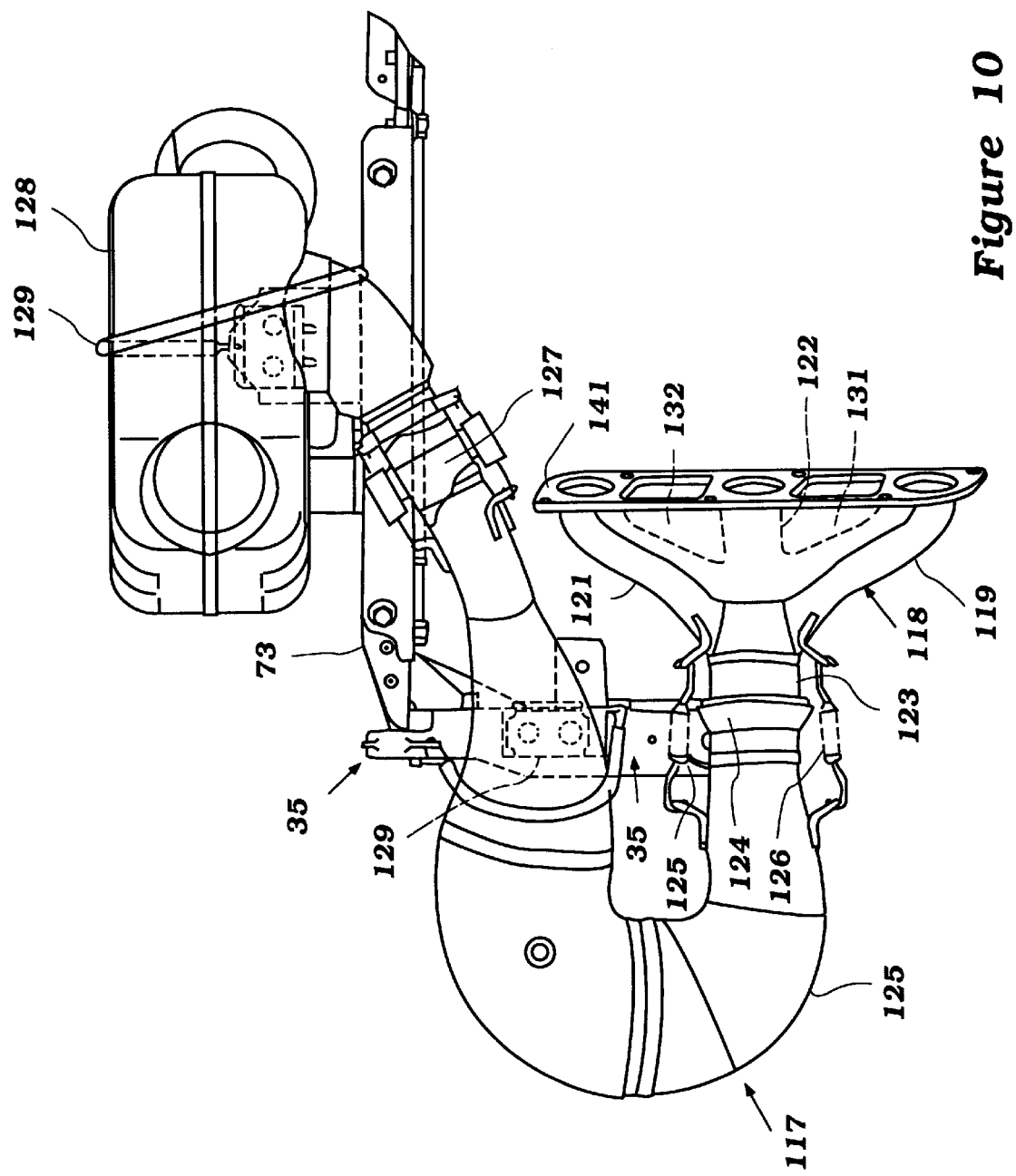
FIG. 10 is a top plan view of the exhaust manifold and exhaust system for the engine with only the exhaust system mounting components of the snowmobile frame illustrated.
Figure 11:
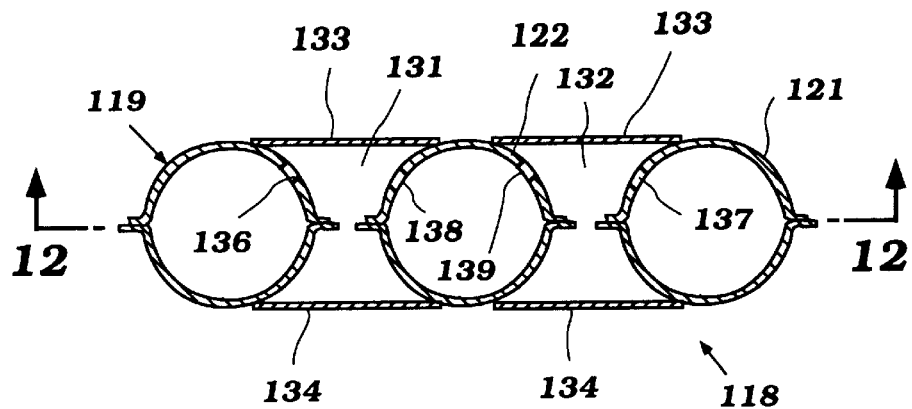
FIG. 11 is a cross-sectional view of the exhaust manifold taken along the line 11—11 of FIG. 12.

The exhaust system 117 is shown in most detail in FIGS. 10–12 and will be described by reference thereto. This exhaust system includes an exhaust manifold assembly, indicated generally by the reference numeral 118. This exhaust manifold assembly 118 is comprised of a pair of end runners 119 and 121 and a center runner 122. Each runner 119, 121, and 122 has the same general construction. That is, the runners 119, 121, and 122 are formed by semi-cylindrical portions that have flanges that are welded together to form the tubular shape thereof as best seen in FIG. 11.

The end runners 119 and 121 join with the center runner 122 close to the discharge end thereof. A collector pipe 123 is joined at the discharge end thereof. This collector pipe 123 has a flanged connection 124 to an expansion chamber device 125. This joint 124 is held together by a spring-type clamp assembly 126.

The expansion chamber device 125 generally curves around an area to clear the steering shaft 115 and is supported on the upper side of the bulkhead 35 within the recess 79. The expansion chamber device 125, in turn, has its discharge end connected by a further spring-held flange connection 127 to a muffler 128. The muffler 128 is supported upon a boss portion 129 of the bulkhead 35 and held in place to the frame subassembly 34 by a spring clip 129. Exhaust gases are discharged to the atmosphere through a suitable exhaust pipe.

Obviously, the exhaust manifold 118 is quite compact and relatively short in length. This is done so as to provide a high degree of exhaust efficiency and good tuning for good high-speed performance. However, because of the fact that the end branch pipes 119 and 121 are connected to the center branch pipe 122 in close proximity and in close proximity to the engine exhaust ports, the engine may experience pulse-back effects that inhibit the charging efficiency and thus can provide dips in the power curve.

Figure 12:
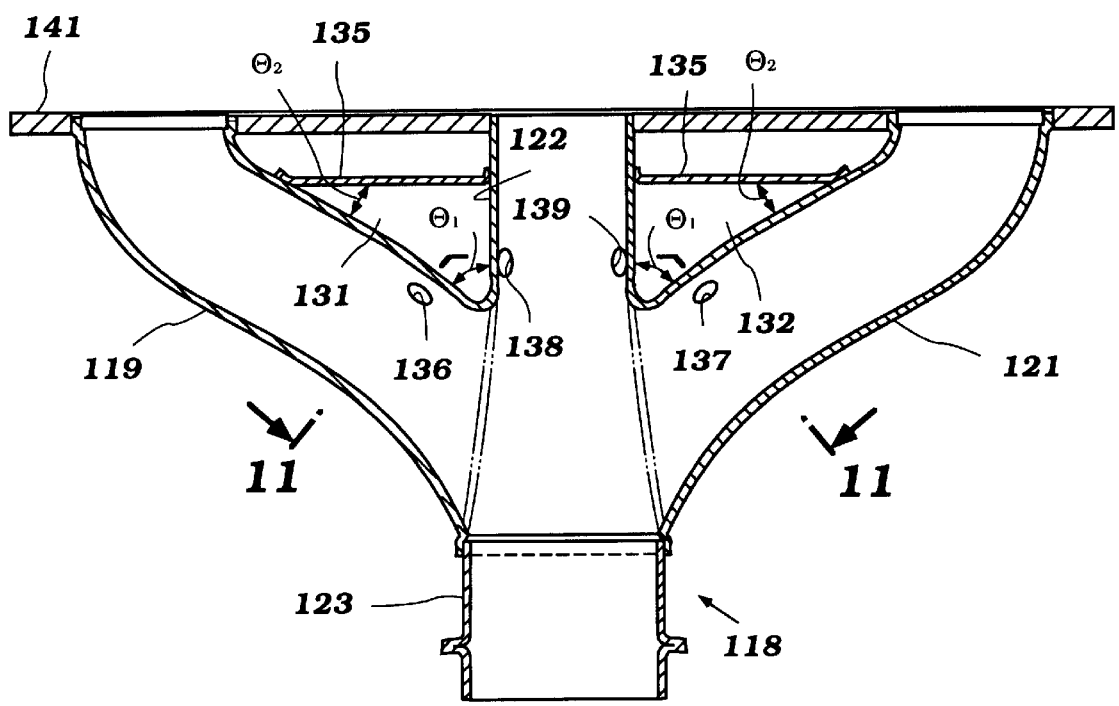
FIG. 12 is a cross-sectional view of the exhaust manifold taken generally along the line 12—12 of FIG. 11.

This falloff in engine performance at low speeds is avoided by providing a pair of expansion chambers, indicated by the reference numerals 131 and 132, best shown in FIGS. 11 and 12 and which have a restricted communication with the branch pipes 119 and 122 and 122 and 121.

These expansion chambers 131 and 132 are easily formed by top plates 133 and bottom plates 134 that are affixed, as by welding, to the upper and lower tubular portions of the pipe branches 119, 122, and 121. The volume of these expansion chambers 131 and 132 is adjusted by providing a vertically extending closure plate 135 across the rearward end of each set of plates 133 and 134.

Each of the end branch pipes 119 and 121 is provided with a respective relatively small communication opening 136 and 137 that is disposed in the angular area $\theta_1$ formed by the juncture of the branch pipes 119 and 122 and 122 and 121. In a like manner, the center branch pipe 122 is formed with a pair of openings 138 and 139 so that the openings 136, 138, 137, and 139 are in this angular area $\theta_1$. This angular area $\theta_1$ is greater than the angular area $\theta_2$ formed where the branch pipes 119 and 121 are joined by the plates 135 so as to afford free access to this area of the exhaust gases.

By providing these small expansion chambers 131 and 132 it is possible to not only reduce the dip in the power curve that occurs a low speed but also to improve the power throughout the entire engine speed range.

Finally, the cylinder block side of the branch pipes 119, 121, and 122 is reinforced by a flange plate 141 that is provided with apertures so that it can be affixed to the cylinder block 111 of the engine 56.

The Transmission

The arrangement by which the engine 56 drives the drive belt 48 will now be described by reference to FIGS. 1, 2, 13 and 14. As has been previously noted, this transmission includes the continuously variable transmission (CVT) indicated generally by the reference numeral 57. This continuously variable transmission 57 includes a driving pulley 142 which is driven from the engine crankshaft 143 via a centrifugal clutch. The variable driving pulley 142 drives a drive belt 143 which, in turn, drives a driven variable pulley 144.

The driven pulley 144 is associated with the intermediate shaft 58. This intermediate shaft 58 extends transversely across the width of the snowmobile frame 32 and terminates at an end that is journaled in an anti-friction bearing 145. The bearing 145 is supported within a transmission casing, indicated generally by the reference numeral 146 that comprises a first member 147 that is affixed to the frame side wall 69. This defines a cavity into which the shaft 58 extends. This cavity is closed by a cover plate 148 that is affixed to the plate 147 with a seal 149 formed therebetween.

The end of the intermediate drive shaft 58 that extends into the transmission case 146 has affixed to it a driving sprocket 151. The driving sprocket 151 has a key connection to the intermediate shaft 58 and is held thereon by a retaining nut 152.

Figure 13:
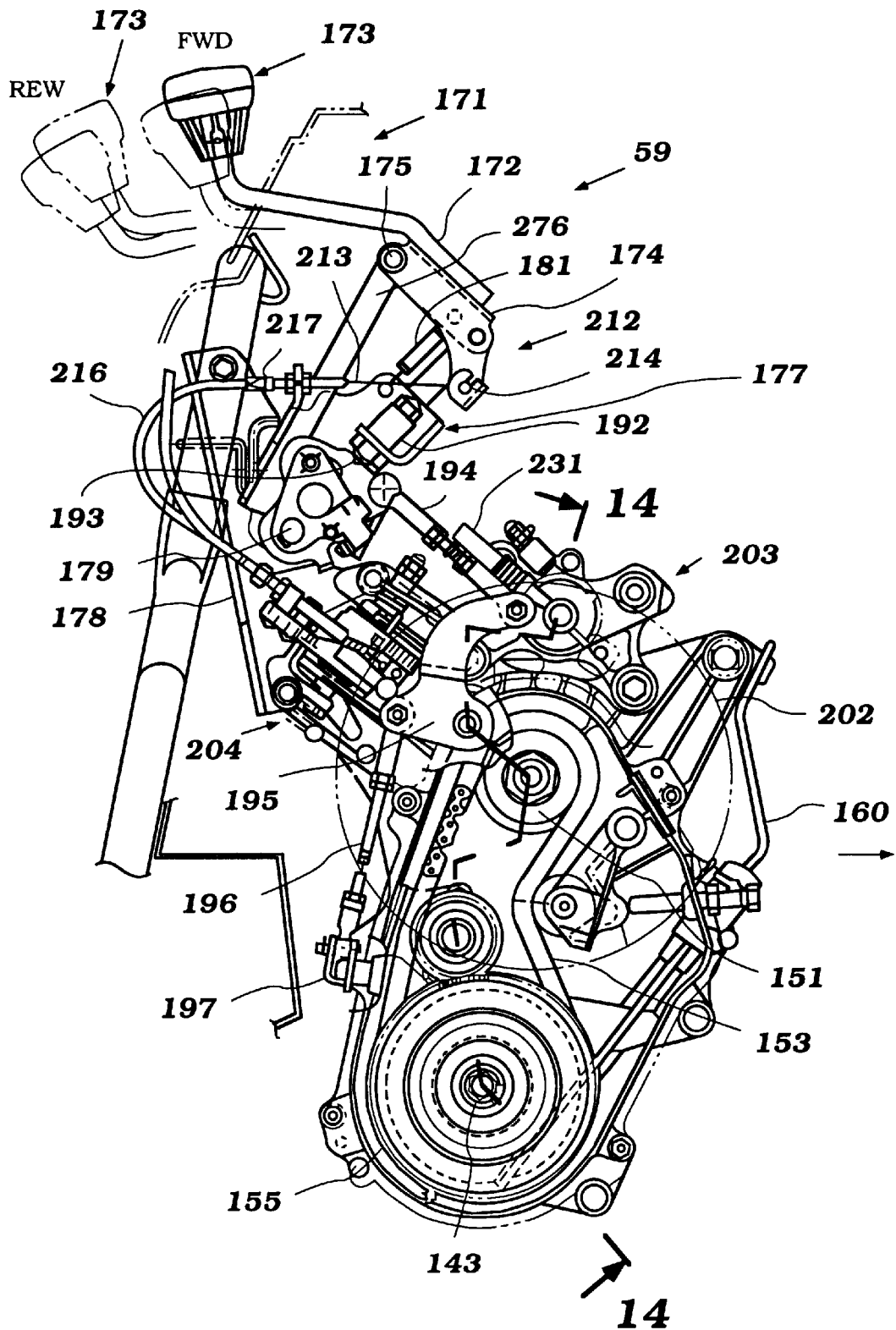
FIG. 13 is a view with portions broken away showing the reversing transmission and control mechanisms therefor.

This sprocket 151 drives a drive chain 153 which, as best seen in FIG. 13, is engaged with a reverse drive sprocket 154 and a forward drive sprocket 155. Both the reverse drive sprocket 154 and the forward drive sprocket 155 rotate in the same direction. However, they are coupled in a different manner to a belt driving shaft 156 which forms the output shaft of the final drive reversing transmission, which transmission is indicated as noted generally by the reference numeral 59 and which includes a reversing drive, as will be described.

Lubricant may be received in the transmission case 146 for lubricating the driving components. The lubricant level may be checked by a dip stick 160.

The reverse drive sprocket 154 is journaled on a stub shaft 157 which is mounted in the casing between the members 147 and 148. The forward driving sprocket 155 is rotatably journaled by means of a needle-bearing assembly 158 on the belt driving shaft 156. In this regard, it should be noted that the belt driving shaft 156 extends through the forward end of the drive belt 48 and has one or more lugs on it which are engaged with corresponding lugs of the drive belt 48 to drive it in a manner well known in this art.

The belt-driving shaft 156 is journaled at one end by a bearing 159 that is fixed to the transmission case 147. The other end of the belt driving shaft 156 may be journaled in a similar bearing carried at the opposite side of the frame assembly 32 and which is not shown.

The reverse drive gear 154 is coupled for rotation with a further reverse drive gear 161, as by drive pins 162. The second reverse drive gear 161 is also journaled on the stub shaft 157 by needle bearings, indicated by the reference numeral 163.

A combined gear and dog clutch member, indicated generally by the reference numeral 164 is splined for rotation with the belt drive shaft 156 outwardly of the forward driving sprocket 155. Actually, the reverse gear and dog clutching member 164 is splined on a tubular stub shaft 165 which in turn has a splined connection to the belt drive shaft 156 inwardly of the needle bearing 158 and which is held axially in place by a retainer element 166 and nut 167.

Figure 14:
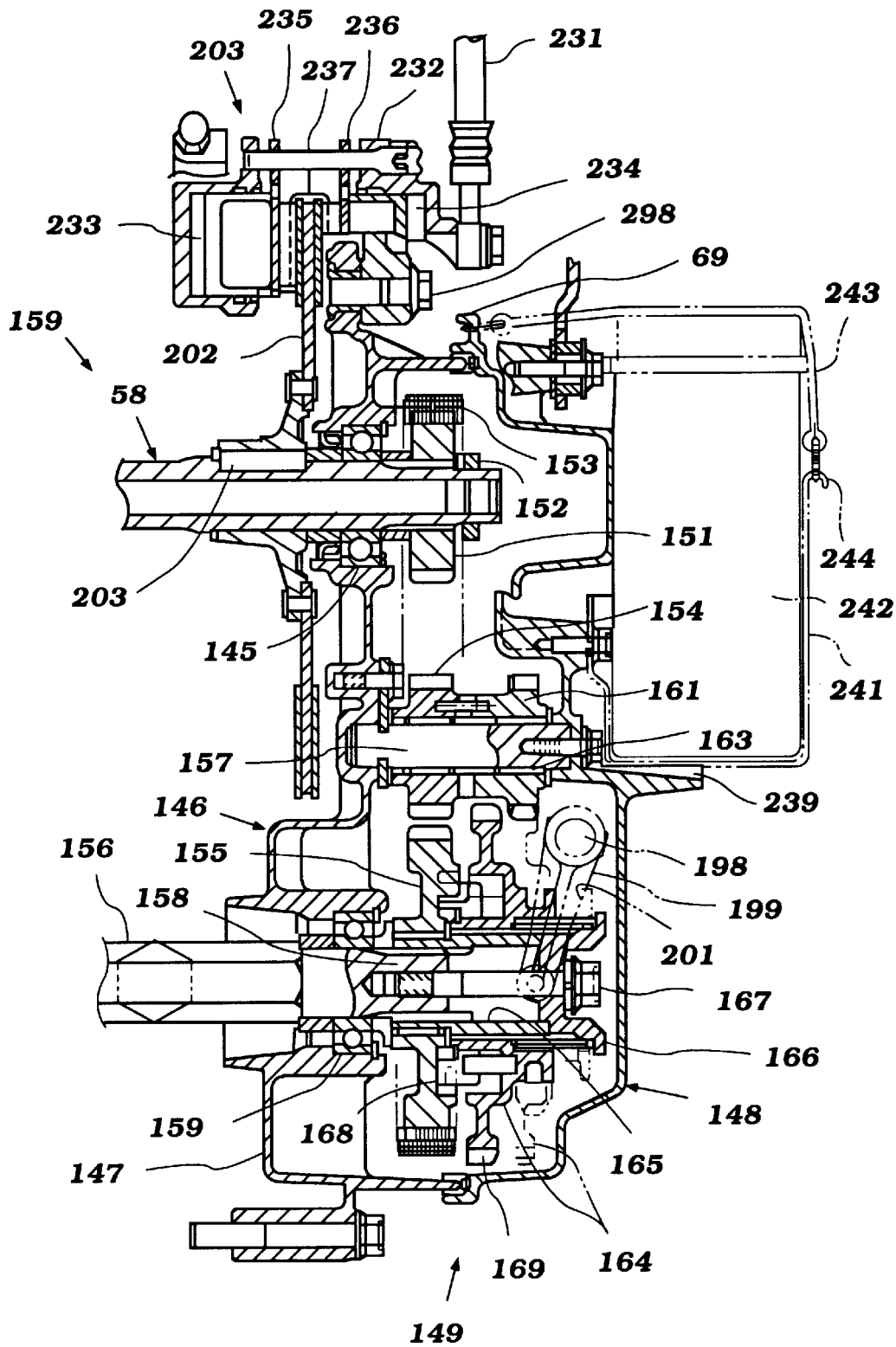
FIG. 14 is an enlarged cross-sectional view through the reversing transmission mechanism taken along the line 14—14 of FIG. 13.

In the forward drive mode, as shown in the solid line view of FIG. 14, dog clutching elements 168 are engaged with the forward drive sprocket 155 so as to establish a driving relationship between this sprocket, the reverse drive gear and dog clutching member 164 and the belt driving shaft.

When the reverse driving gear and dog clutching member 164 is shifted to the right as shown in FIG. 14 to the phantom line position, the teeth 169 of the gear 164 will be brought into meshing relationship with the teeth of the second reverse drive gear 161. At this time, the gear 164, stub shaft 165, and belt driving shaft 156 will be driven in an opposite direction or the reverse drive direction. Hence, a very compact but highly effective forward reverse transmission is provided by this mechanism.

The Transmission Control

The shifting mechanism by which this transmission reversal is obtained will now be described by primary reference to FIGS. 13–15, and 17. The shifting of the transmission 59 between its forward drive mode and its reverse drive mode is controlled by an operator control shift lever, indicated generally by the reference numeral 171 and which is mounted on the right-hand side of the vehicle in close proximity to the handlebar 37.

This shifting mechanism includes a shift rod 172 that carries a shift knob 173 at one end thereof. The shift rod 172 is connected at its opposite end, as by welding, to a shift bracket 174. The shift bracket 174 is pivotally connected about a pivot pin 175 to a shift lever 176. The pivotal movement of the bracket 174 about the shift lever 176 is utilized to provide a release for a locking mechanism which locks the shift lever assembly 171 in either its forward and reverse drive positions. In addition, this pivotal movement is also utilized to actuate a brake, as will be described, so as to retard the rotation of the intermediate shaft 58 so as to facilitate smooth shifting. This braking action occurs temporarily during the movement between the forward drive position and the reverse drive position as shown in FIG. 13 and which motion will be described in more detail later after the total mechanism is described.

The shift lever 176 is disconnectedly connected to a further bracket mechanism 177 which is pivotally supported on a mounting bracket 178 by means of a further pivot pin 179. The bracket 178 is conveniently affixed to an appropriate portion of the frame assembly. A tension spring 181 is interlocked between the shift bracket 174 and the plate 177 and normally biases the mechanism to the position wherein the shift rod 172 is pivoted to an upward location as shown in the solid line FWD position in FIG. 13. This maintains a latch mechanism, indicated generally by the reference numeral 182 in position. This latch mechanism 182 will now be described by primary reference to FIG. 15.

Figure 15:
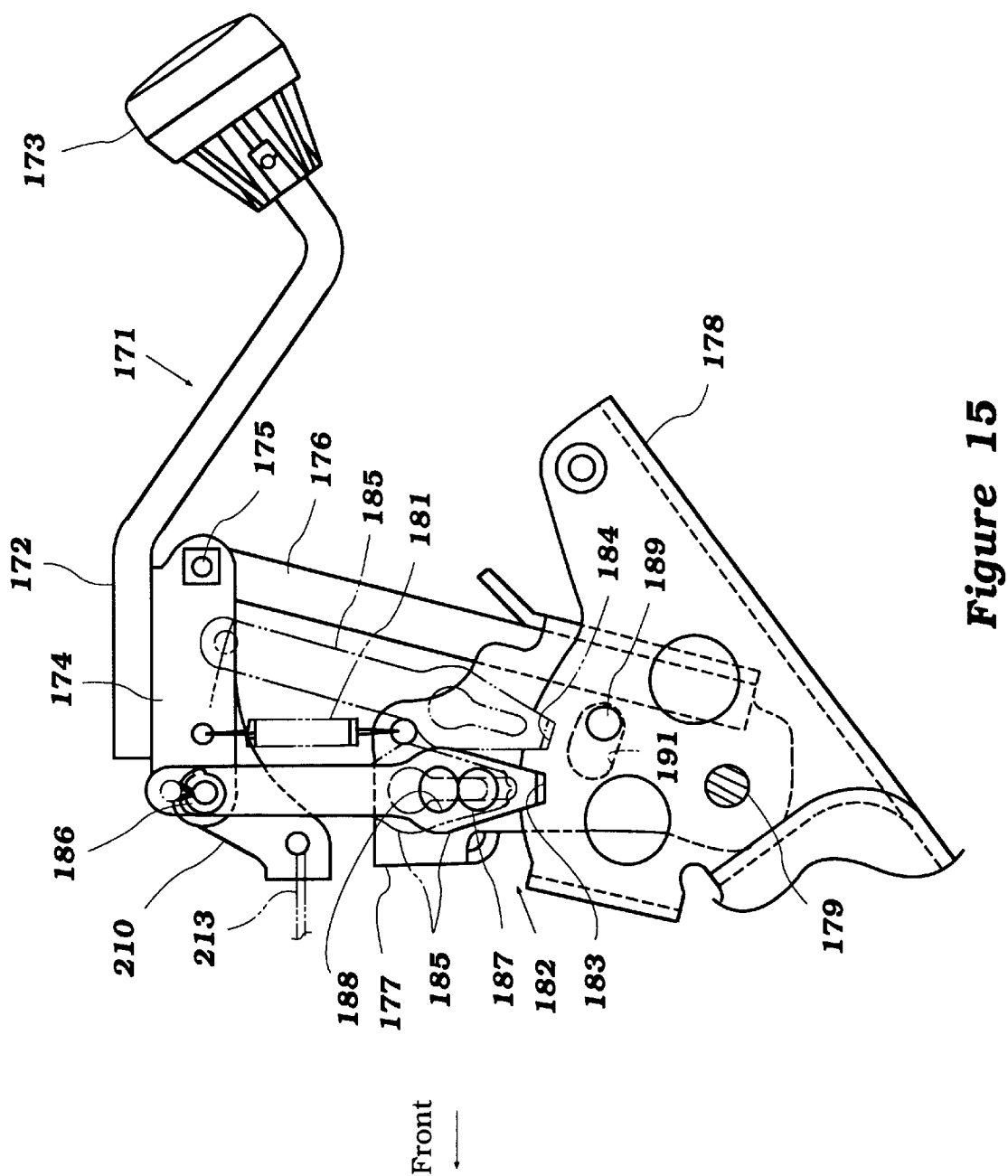
FIG. 15 is a view looking in the direction opposite that of FIG. 13, but showing only the reversing transmission control actuating lever system.

As seen in FIG. 15, the fixed mounting bracket 178 is formed with a first, forward locking notch 183 and a second, reverse locking notch 184. A sliding latch pin 185 has a pivotal connection, at 186 to the shift bracket 174 adjacent the tension spring 181 and at a location spaced from the pivot pin 175. This latch pin 185 will be reciprocated upwardly or downwardly upon pivotal movement of the shifting bracket 174 around the pivot pin 175.

A headed fastener 187 extends through a key hole slot 188 formed in the lower portion of the latching pin 185 so as to retain it axially in position but to permit this reciprocal motion.

A pin 189 is carried by the mounting bracket 178 and extends into an arcuate slot 191 formed in the plate 177. The arc of the slot 191 is around a radius that is coincident with the axis defined by the pivot pin 179. The length of the slot 191 limits the degree of pivotal movement of the lever 176 about the pivot pin 179.

In order to ensure smooth shifting, the lever shaft 176 and plate 177 have a disconnectable detent connection between them. To this end, the plate 177 is formed with a portion that carries a spring biased plunger 192. This plunger 192 can be received in a detent recess 193 formed in the plate 177 so as to permit some movement of the shift lever 176 without accompanying movement of the plate 177. This is done so as to permit some movement until the dog clutching elements 168 engage with the forward drive gear 155.

Continuing to refer to the shift mechanism and now referring primarily to FIG. 13, it will be seen that a first shift link 194 is pivotally connected at one end to the shift plate 177. The opposite end of the shift link 194 is pivotally connected to a bell crank 195 that is journaled for pivotal movement on the transmission case 146. A further shift link 196 is pivotally connected at one end to the bell crank 195 and at the other end to a shift yoke 197 which also appears in FIG. 17. This shift yoke 197 is coupled to a shift shaft 198 which is journaled in the transmission housing piece 148 and which carries a shift fork 199. The shift fork 199, in turn, has its end portions received in a shift collar 201 that is formed integrally with the reverse gear and dog clutching member 164. Hence, pivotal movement of the shift fork 199 moves the reverse gear and dog clutching member 164 between the forward drive position shown in solid lines in FIG. 14 and the reverse drive position shown in phantom lines in this figure.

This shifting operation is achieved by the motions which will now be described by primary reference to FIGS. 13–15 and primarily FIGS. 13 and 15. Considering the transmission to be in the forward drive position as shown in solid lines in the figures, the operator first depresses the shift knob 173 so as to pivot the shift rod 172 and shift bracket 174 about the pivotal connection 175 to the shift lever 176. This will cause the shift locking pin 185 to be moved from the solid line position shown at the left-hand side of FIG. 15 axially outward of the forward locking slot 183. During this time, the tension spring 181 will be loaded.

Having thus released the lock, the operator can then pivot the shift lever 176 and shift plate 177 in a rearward direction which would be counter-clockwise in FIG. 13 and clockwise in FIG. 15. During this shifting motion, the detents 192 and 193 may be released if there is great resistance to shifting. In any event, once the shift is completed, then the locking pin 185 will register with the reverse lock slot 184 of the bracket 178. When the operator then releases the pressure on the shift knob 173, the locking pin 185 will be urged by the spring 181 into the reverse locking slot 184. This position is shown in phantom lines in FIG. 15.

The Shift Assist Brake

As has been noted, the transmission control mechanism 171 also incorporates an arrangement for braking the rotation of the intermediate driving shaft 58 at the times when the transmission is shifted between its forward drive position and its reverse drive position. That braking mechanism will now be described by particular reference to FIGS. 13, 14, and 16.

As has been noted, the snowmobile 31 is provided with a main service braking system which service braking system operates on the intermediate driving shaft 58. This main braking system includes a brake disc or rotor 202 which is affixed for rotation by a keyed connection 203 with the intermediate driving shaft 58. A service or main braking system, indicated generally by the reference numeral 203 is associated with this brake disc 202 for braking the operation of the snowmobile 31 during normal operation. This main braking system will be described later.

In addition to the main service brake 203, an auxiliary and parking brake caliper assembly, indicated generally by the reference numeral 204 also cooperates with the brake disc 202 for braking its rotation and that of the intermediate drive shaft 58. This caliper 204 includes a pair of scissors like caliper members 205 and 206 that are pivotally connected to each other by a pivot pin 207. The pivot pin 207 is, in turn, fixed to the mounting bracket 178 so as to be held against rotation relative to the frame assembly 32.

Figure 16:
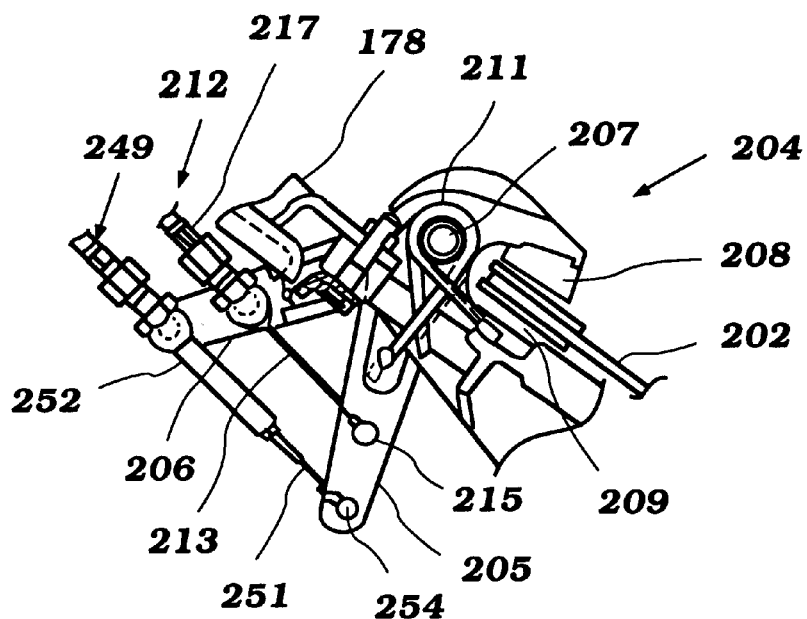
FIG. 16 is a side elevational view showing the brake mechanism associated with the transmission control and also with the parking brake.
Figure 17:
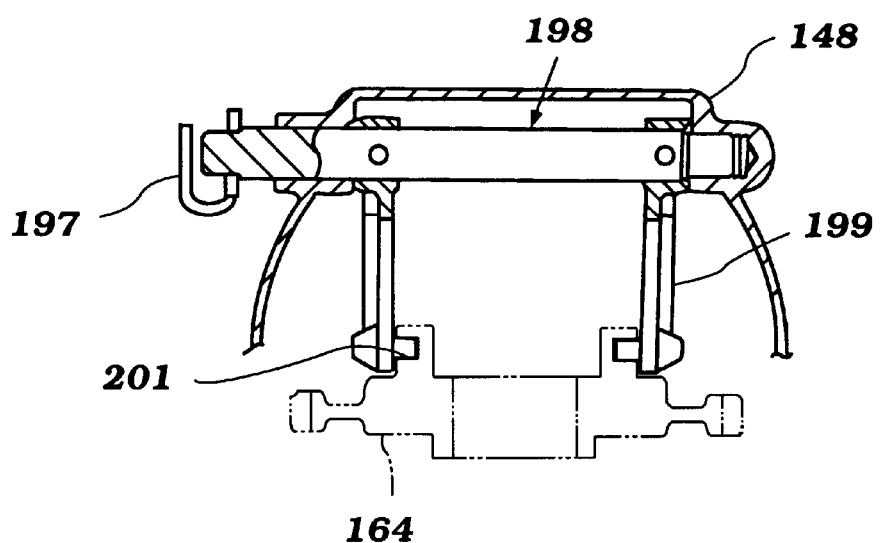
FIG. 17 is a partial cross-sectional view showing the shifting fork of the transmission mechanism and the actuating portion therefor.

The caliper leg 205 supports a first brake pad 208 that is disposed on one side of the brake disc 202. The caliper leg 206 supports a second brake pad 209 that is disposed on the opposite side of the brake disc 202 in confronting relationship to the brake pad 208. A torsional spring 211 encircles the pivot pin 207 and urges the brake caliper members 205 and 206 to a released position as shown in FIG. 16.

In order to actuate the caliper assembly 204 to its brake position, a wire actuator assembly, indicated generally by the reference numeral 212 is provided and which cooperates with an extension 210 of the shift actuating bracket 174 so as to actuate the brake caliper 204 when the lever 174 is pivoted about the pivot pin 175 simultaneously with the release of the shift latch mechanism 182.

To this end, a wire actuator 213 is affixed, as at 214 to the extension 210 of the shift actuating lever 174 at one end of the wire actuator 213. The other end of the wire actuator 213 is connected by a ferrule 215 to the caliper member 205.

A protective sheath 216 of the wire actuator 212 has one end portion 217 affixed to the lever 176 of the shift actuator. The other end of the sheath 216 is affixed, as at 217, to the remaining caliper member 206.

As a result of these connections of the wire actuator 212, when the shift rod 172 and shift lever 174 are pivoted about the pivot pin 175, the wire actuator 213 will be pulled through the sheath 216, and the sheath 216 will be forced in the opposite direction. This causes the caliper members 205 and 206 to pivot relative to each other in opposite directions about the pivot pin 207 to compress the torsional spring 211. This action brings the brake pads 208 and 209 into braking relationship with the brake disc 202. Hence, before the shift is actually effected, the brake assembly 204 will be energized, and the rotation of the transmission elements will be braked.

The shift is then executed in the manner aforenoted. After the shift has been completed, the release of the shift rod 172 and shift lever 174 will cause the spring 211 along with the operation of the tension spring 181 to return the mechanism to its position, and the brake will be released as the shift is completed. It should be readily apparent to those skilled in the art that the brake actuation occurs during the shifting process from forward to reverse, or from reverse to forward.

The Main Throttle and Brake Controls

Figure 19:
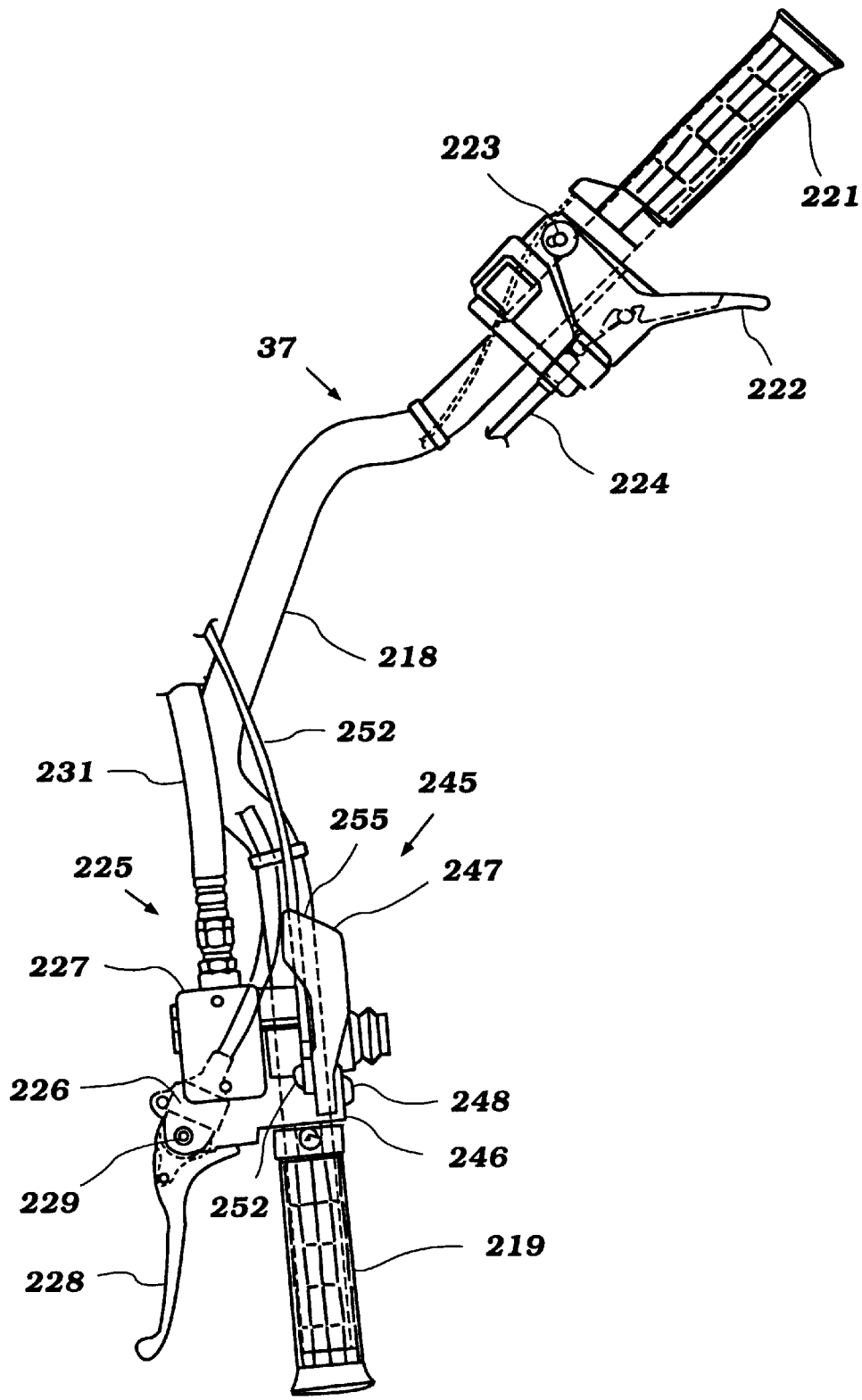
FIG. 19 is a top plan view showing the handlebar and the controls associated therewith.

The throttle control and main braking control for the snowmobile 31 will now be described by reference to FIGS. 2 and 19, for the actuator mechanisms, and to FIG. 14, for the service brake actuating mechanism. Referring first to FIG. 19, the handlebar assembly 37 is shown in more detail. This includes a main handlebar 218 that has hand grips 219 and 221 at its opposite ends. Associated with the right-hand hand grip 221 is a throttle control lever 222.

This throttle control lever 222 is pivotally supported on the end of the handlebar 218 adjacent the hand grip 221 by a pivot pin 223. A wire actuator 224 is associated with the throttle lever 222 at one end and with the throttle valves of the carburetors 114 at the opposite end so as to permit the operator to open and close the throttle valves and control the speed of the engine. A suitable return spring is employed so that when the throttle lever 222 is released, the throttle valves will be returned to their idle position.

Adjacent the handlebar assembly 219 is the service brake control mechanism, indicated generally by the reference numeral 225. This service brake control mechanism includes a mounting bracket 226 that carries a master cylinder 227. A service brake actuating lever 228 is mounted for pivotal movement on the bracket 226 by a pivot pin 229. Pivotal movement of the service brake lever 228 will pressurize the master cylinder 227 and direct hydraulic fluid under pressure through a brake line 231.

Referring now to FIG. 14, the opposite end of the brake line 231 is connected to a caliper assembly 232 of the service brake 203. The connection provides hydraulic fluid to a pair of fluid chambers 233 and 234 formed on the opposite legs of the caliper assembly 232. Hydraulic pistons in these chambers 233 and 234 act upon brake pads 235 and 236, respectively, which are slidably supported on pins 237 that span the legs of the caliper assembly 232. When these brake pads 235 and 236 are actuated, they will be forced in opposite directions into engagement with the brake disc 202 to brake its rotation.

The caliper assembly 232 is fixed relative to the vehicle frame by fasteners 238 which bolt the caliper assembly 232 to the transmission housing 146 and, accordingly, to the snowmobile frame 32.

Figure 18:
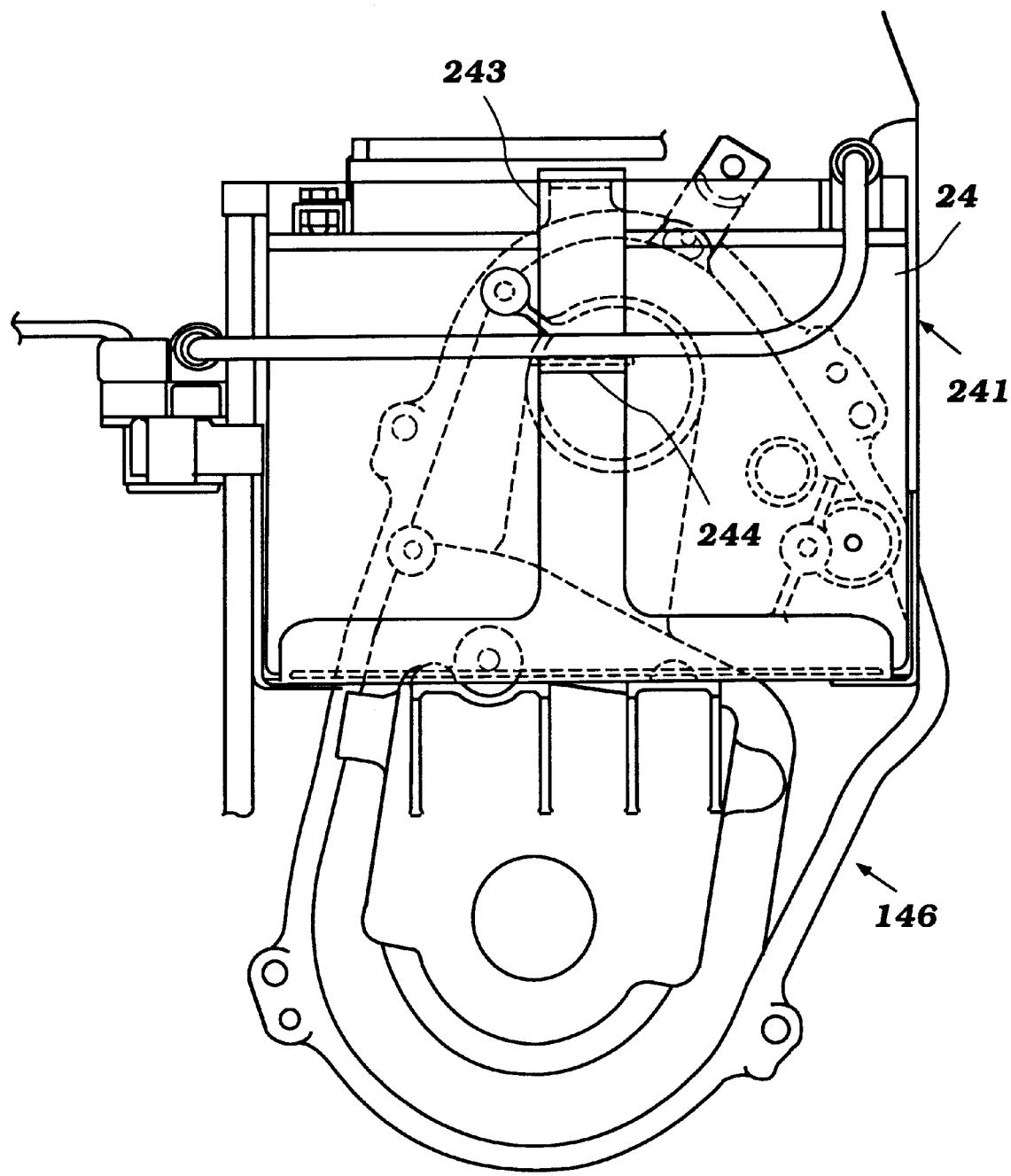
FIG. 18 is a view looking in the same direction as FIG. 13, but showing the association of the transmission to the battery for the vehicle and illustrating the battery mounting arrangement.

As may be best seen in FIGS. 14 and 18, the area adjacent the transmission case 146 is formed with a ledge 239 that supports a battery carrier 241. A storage battery 242 is retained in the battery carrier 241 by a strap 243 that is connected at its opposite ends to the frame assembly so as to fix the battery 242 in place. The strap 243 cooperates with a retainer 244 formed on the battery case 241.

The Parking Brake

Figure 20:
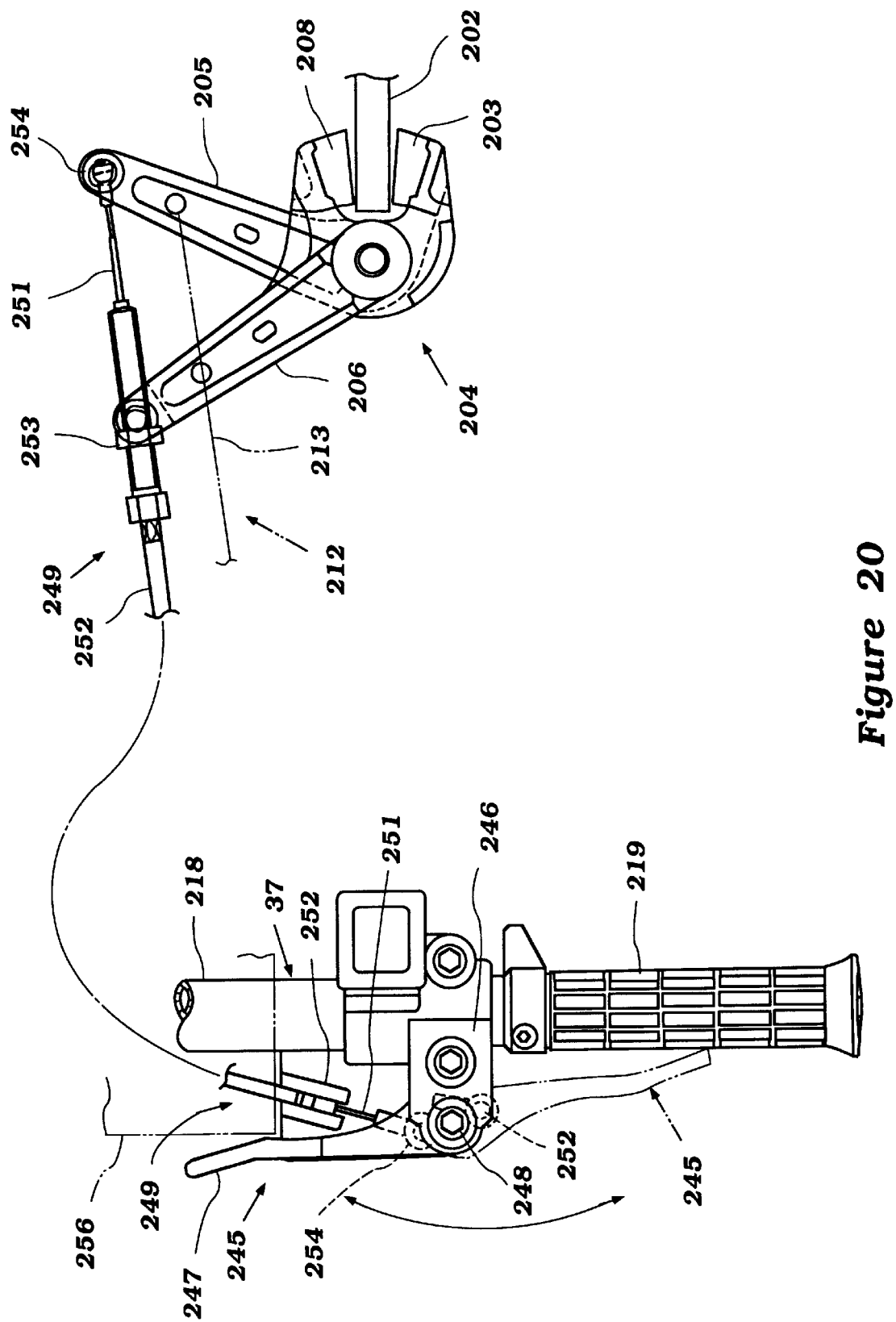
FIG. 20 is a top plan view showing the parking brake control and its association with the parking brake which has been shown out of position to illustrate it in this figure.

The snowmobile 31 is also provided, in addition to the service brake 203 and the transmission shift assist brake, a parking brake assembly. This parking brake assembly is actuated by a parking brake control lever mechanism. This parking brake control lever mechanism is indicated generally by the reference numeral 245, as seen in FIGS. 19 and 20, operates the mechanical caliper-type brake 204 by effecting counter-pivotal movement of the caliper members 205 and 206. This mechanism will now be described by reference to those FIGS. (19 and 20).

The parking brake mechanism includes a mounting bracket assembly 246 that is affixed appropriately to the handlebar member 218 adjacent the hand grip 219 and in proximity to the service brake actuating mechanism 225. However, this parking brake actuating mechanism 245 is configured so as to avoid inadvertent operation of the parking brake 245 and to afford a warning to the operator when the parking brake lever 245 is in its braking position, as will become apparent.

The parking brake mechanism actuating lever 245 includes a lever 247 which is pivotally mounted on the bracket 246 by a pivot pin 248. It should be noted that the pivot axis defined by the pivot pin 248 extends transversely to the pivot axis of the service brake actuating lever 228 defined by the pivot pin 229. In addition, the brake actuating levers are on opposite sides of the handlebar assembly 37.

A wire actuator, indicated generally by the reference numeral 249, has a wire portion 251 which is connected by a ferrule and pivot pin 252 to the parking brake lever 247.

The pivot pin 252 is disposed at an offset location to the pivot pin 248 for the lever 247 and provides an over-center relationship, as will be described.

A wire sheath 252 encircles the wire portion 251 and is fixed at one end to the mounting bracket 246. The other end of the wire sheath 252 is affixed to the caliper member 206 by a fastener assembly 253. It should be noted that this connection for the wire actuator 249 is located radially outwardly from the pivot pin 207 of the caliper assembly 204 from the connection of the wire actuator 212. This provides a greater mechanical advantage. It is important that the parking brake mechanism exert more force on the caliper 204 than the transmission braking mechanism, for obvious reasons.

The opposite end of the wire actuator 251 is connected by means of a ferrule 254 to the remaining caliper member 205.

The parking brake actuating lever 247 is provided with a folded-over end portion 255 that extends transversely to its main portion and which thus provides a part that will be easy for the operator to access, even though he is wearing heavy gloves. This off-turned portion 255 is, however, configured so as to provide a neat appearance and to avoid unnecessary protrusion.

As seen in FIG. 20, when the parking brake lever 247 is in its released position, as shown in solid lines, the pivot pin 252 will be disposed on one side of the pivot axis 248 of the lever 247. Hence, there will be an over-center relationship established that will tend to retain the parking brake lever 245 in this position.

When the operator wishes to engage the parking brake, the lever 247 is rotated, as shown by the arrow in FIG. 20, to the phantom line or engaged position. When this occurs, a tensile force will be placed on the wire actuator 251 so as to pivot the caliper member 205 in a counter-clockwise direction, as seen in FIG. 20. At the same time, a force will be exerted through the wire sheath 252 on the caliper member 206 to cause it to rotate in the clockwise direction. Hence, the brake pads 208 and 209 will be forced into engagement with the disk 202 to brake its rotation.

In this position, the pivot pin 252 moves to the other side of the supporting pivot pin 248 for the parking brake lever 247. In this condition, a further over-center relationship is established that will retain the parking brake in its engaged position.

Also, it should be noted that in this position, the parking brake lever 247 will be readily visible to the operator. In addition, if he attempts to put his hand on the handle grip 219, he will notice the presence of the parking brake lever 247 in its engaged position. Thus, the likelihood of inadvertent attempts to operate the snowmobile 31 with the parking brake assembly engaged will be avoided.

Finally, in connection with the handlebar and control assembly, it should be noted that the central portion of the handlebar 218 is covered by a protective covering 256. This protective covering covers the center portion of the handlebar assembly 218 between the throttle control mechanism 222 and the brake controlling mechanisms 225 and 245. Thus, a neat appearance is provided. Again, however, the off-turned portion 255 of the parking brake lever 247 will permit a rider with gloves to move the parking brake 247 between its release to its engaged positions, even when wearing thick gloves.

The Engine Cooling System

As has been noted, the engine 56 is of the water-cooled type. Cooling liquid, such as an anti-freeze type coolant, is provided in the cooling jacket of the engine 56. This coolant is circulated through a heat exchanging system, shown in FIGS. 21–25, for exchanging heat between the engine and the atmosphere to keep the engine 56 at its desired operating temperature. This cooling system includes a number of heat exchangers which are interrelated with the frame assembly 32, and more particularly, the rear frame subassembly 33 and front frame subassembly 34 so as to provide not only adequate cooling, but also to add to the rigidity of the frame structure. This permits a lightening in weight of the frame without any structural sacrifices.

This heat exchanger system includes a front heat exchanger, indicated generally by the reference numeral 257, a pair of side heat exchangers, indicated generally by the reference numerals 258 and 259, and a rear heat exchanger, indicated generally by the reference numeral 261. As may be seen by reference to FIGS. 21 and 22, the heat exchangers 257, 258, 259 and 261 are disposed in proximity to, but surrounding relationship with, the drive belt 48.

In addition, the front and rear heat exchangers 257 and 261 span the frame assembly from side-to-side, and thus provide reinforcing as will be described. In a like manner, the side heat exchangers 258 and 259 underlie and are, in effect, integrally connected to the footstep portions 63 and 64 of the rear frame subassembly 33, so as to further rigidify this construction. The construction of the individual heat exchangers will be described first, and then their relationship to the frame assembly and the overall cooling system will be described.

Figure 23:
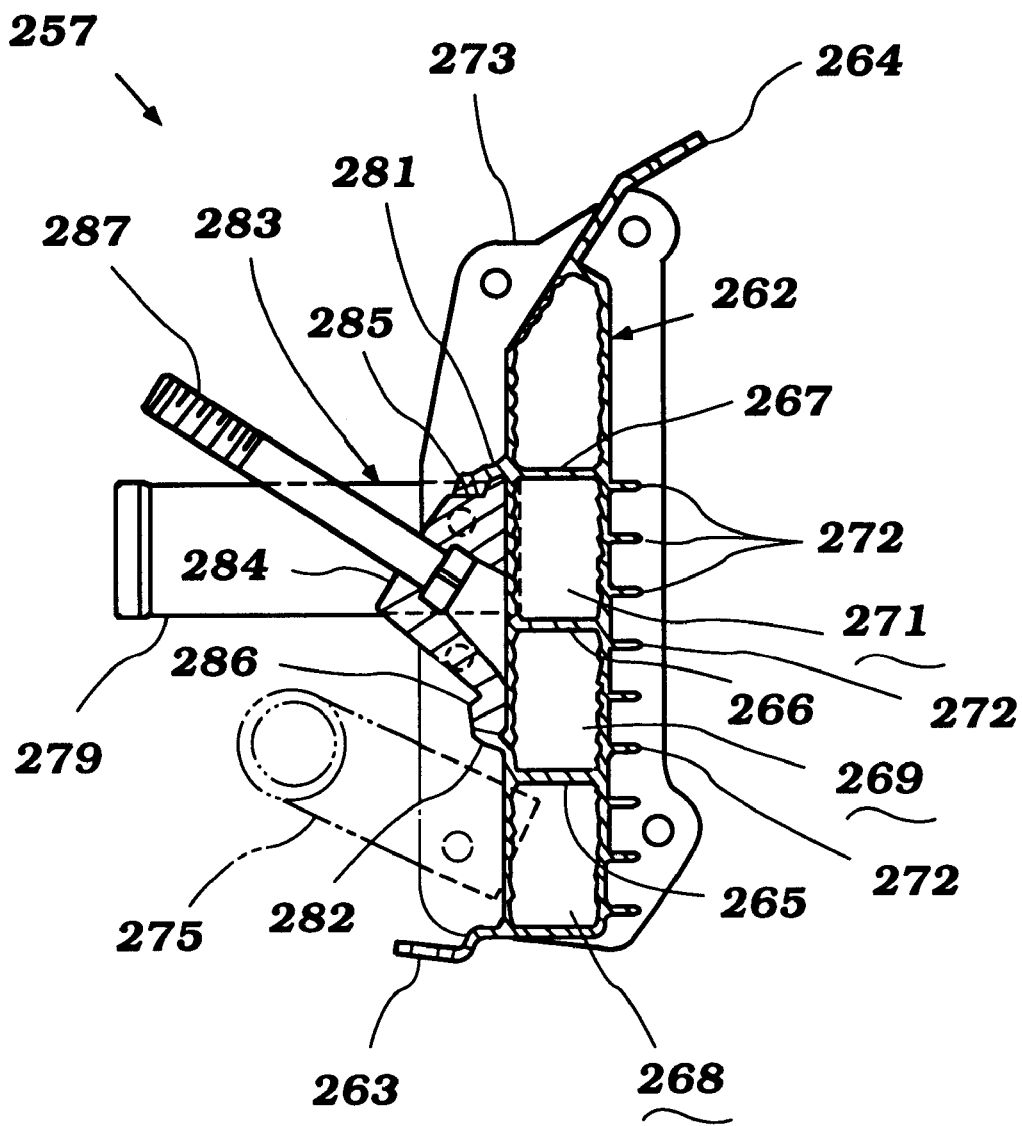
FIG. 23 is a cross-sectional view taken through and showing the front radiator on a larger scale and taken along the line 23—23 of both FIGS. 22 and 24.
Figure 24:
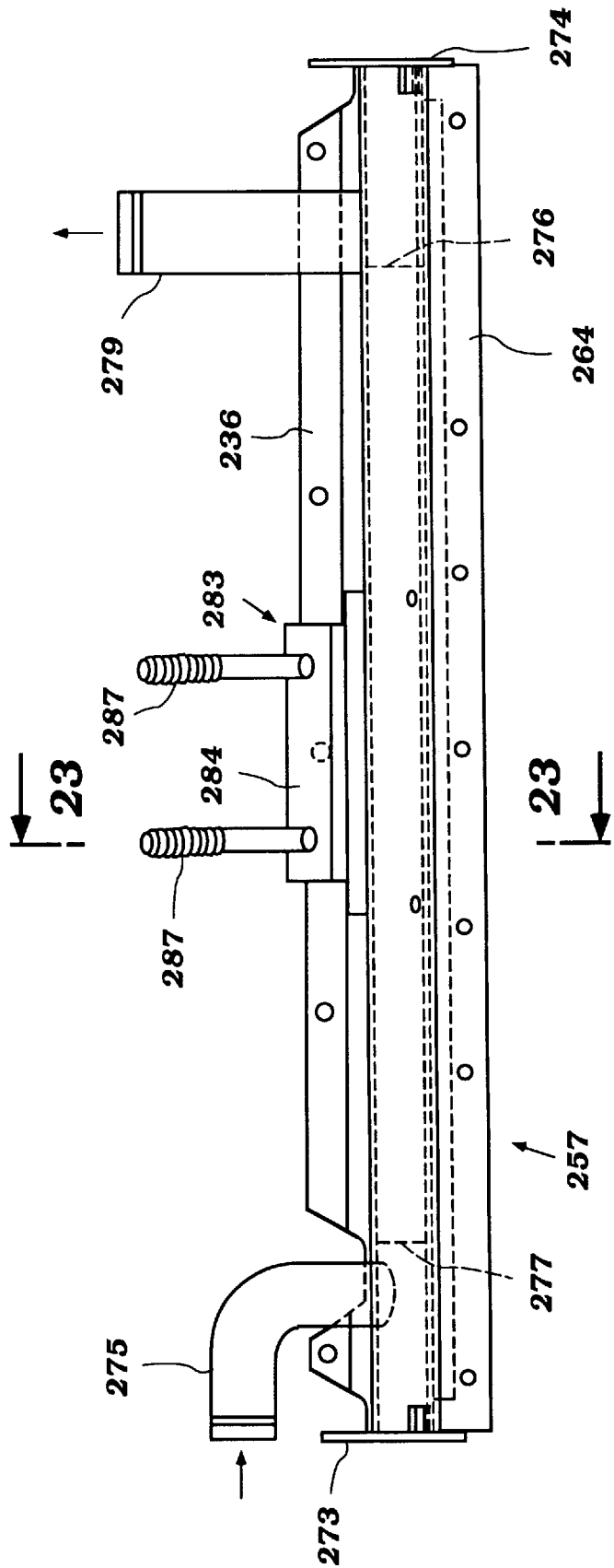
FIG. 24 is an enlarged top plan view of the front radiator.

Referring first primarily to FIGS. 23 and 24, the front heat exchanger 257 will be described. This heat exchanger 257 includes a main body portion 262 which is formed as an extrusion from a lightweight material having a high coefficient of conductivity, such as aluminum or an aluminum alloy. This extrusion 262 is formed with a lower flange portion 263 and an upper flange portion 264. These flange portions 263 and 264 are formed with a plurality of openings that pass threaded fasteners or rivets so that the heat exchanger 257 can be rigidly affixed in the frame assembly, and particularly extending across an opening formed in the front frame subassembly 34 below the inclined wall 76, as seen in FIG. 7. Thus the heat exchanger 257 extends transversely across and also to provide reinforcing for this area of the frame assembly. Other relationships between the heat exchanger 257 and the other components of the snowmobile will be described later.

The interior portion of the extrusion 262 is divided by a plurality of internal walls 265, 266 and 267 into parallel extending flow chambers 268, 269 and 271. Cooling fins 272 extend rearwardly from these chambers into the frame assembly in an area where they will experience air flow, and thus afford cooling for the coolant circulated therethrough.

The ends of these chambers 268, 269 and 271 are closed by end plates 273 and 274 so as to provide a water-tight closure for these flow paths. These ends plates 273 and 274 are also formed with openings so as to permit attachment to the sides 68 and 69 of the front frame subassembly 34 so as to further rigidify this structure.

An L-shaped water coolant inlet pipe 275 is formed at one side of the extrusion 262 in communication with the left-hand side of the lower water channel 268. The wall 265 extends uninterruptedly from the end plate 273 and terminates at an end portion 276 (FIG. 24) that is spaced from the end plate 274. Hence, the coolant which is flowing from left to right through the channel 268 may then flow upwardly into the channel 269. This coolant then can flow transversely back across the extrusion 262 toward the end plate 273.

The wall 266 terminates at an end portion 277 that terminates short of the end plate 273 so that coolant that has passed along the channel 269 may then flow upwardly into the channel 271. The coolant then reverses its flow and flows back to an outlet tube 279 that is affixed to the front side of the extrusion 262 and which delivers the coolant, in a manner to be described, to the engine water pump.

Figure 7:
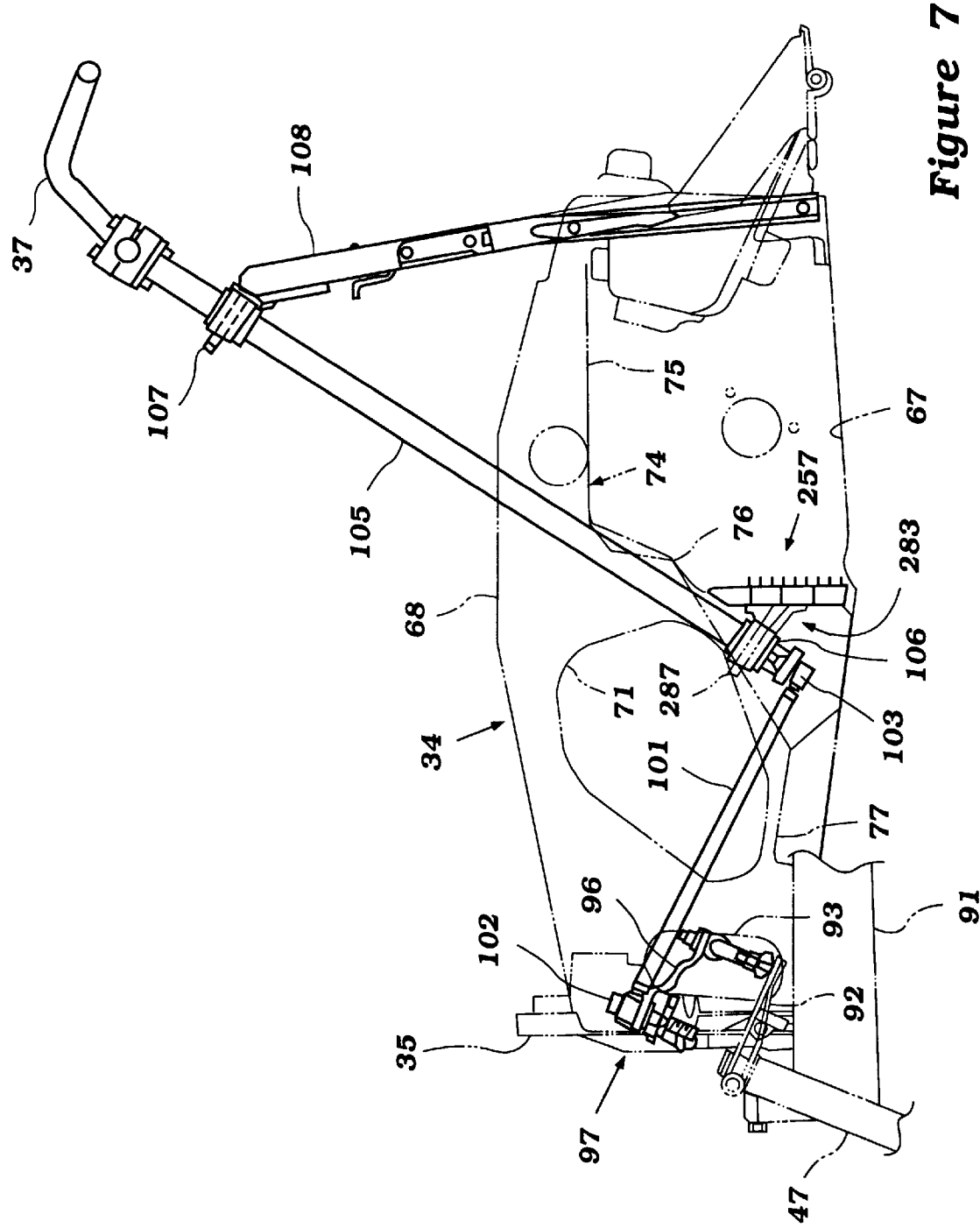
FIG. 7 is a side elevational view of the same components shown in FIG. 4, but on a slightly smaller scale, to illustrate the steering mechanism for the front skis.

As may be best seen in FIGS. 7, 23 and 24, the forward portion of the front heat exchanger 257 extends through an opening in the frame member 76. The front of the extrusion 262 is provided with an upper flange 281 and a lower flange 282. The flanges 281 and 282 are integrally connected to the extrusion 262 and define a cavity for holding a steering shaft support assembly, indicated generally by the reference numeral 283.

This support assembly 283 is comprised of a casting or forging 284 which is formed from an aluminum or aluminum alloy. This member 284 is received within the area bounded by the flanges 281 and 282 and is rigidly affixed thereto as by weld beads 285 and 286. This thus adds rigidity to the heat exchanger 262 and the frame assembly.

A pair of threaded fasteners 287 are carried by this member 284 and afford attachment for the bearing assembly 106 which forms the aforenoted journal for the lower end of the steering shaft 105. Thus, this assembly for the front heat exchanger 257 provides not only adequate and efficient cooling for the engine 56, but also adds to the rigidity of the frame assembly and permits it to function to journal the lower end of the steering shaft 105.

Figure 25:
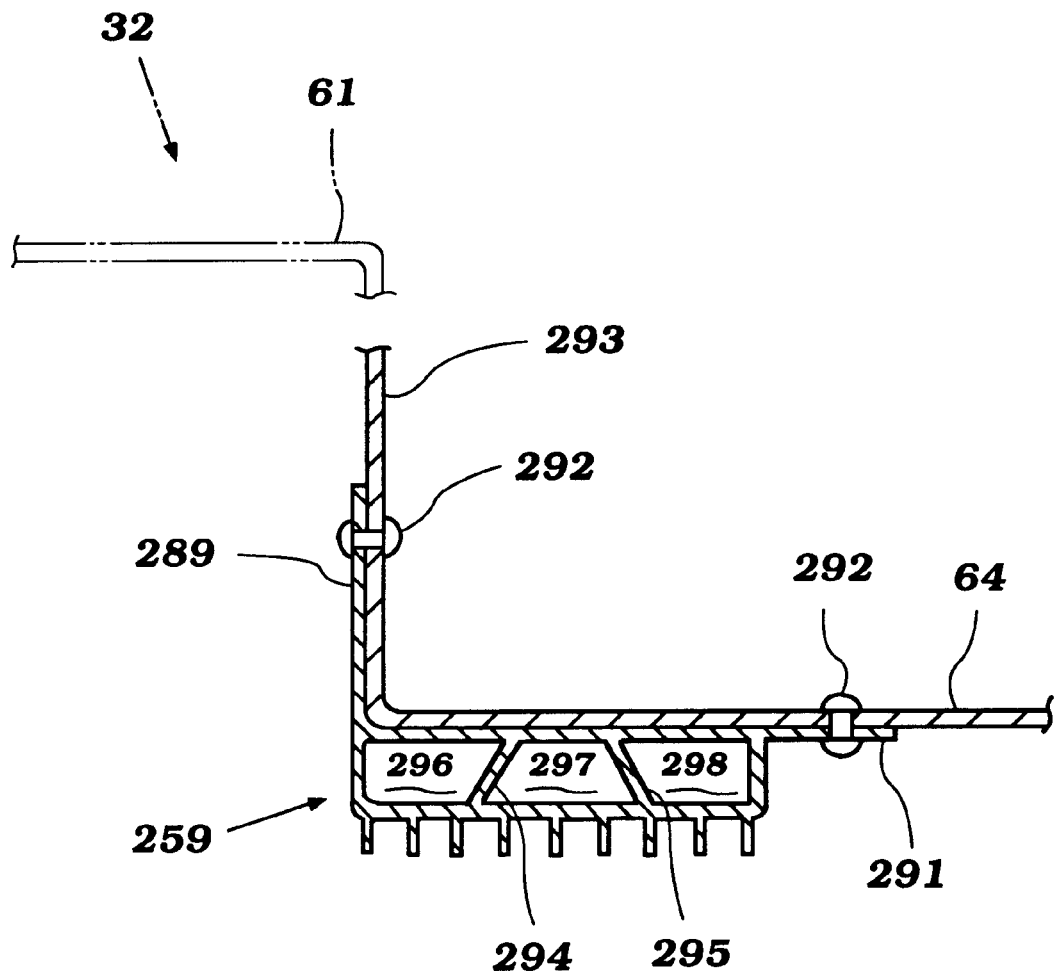
FIG. 25 is a cross-sectional view taken along the line 25—25 of FIG. 21 and shows one of the side radiators.

The construction of the side heat exchangers 258 and 259 will now be described by primary reference to FIG. 25, although this structure also is shown in the other figures showing the cooling system. The heat exchangers 258 and 259 are actually identical in construction, but one is reversed relative to the other. The reason for this will be described.

Each heat exchanger is comprised of a generally L-shaped assembly having a vertically extending leg 289 and a horizontally extending leg 291. These legs are apertured so as to permit connection by rivets 292, or the like, to a vertically extending walls 62 that connect the frame portion 61 with the frame portions 63 and 64. The leg 291 is affixed to the underside of the footrest portions 63 and 64, and thus, the heat exchangers 258 and 259 further rigidify the frame assembly 32, particularly in this critical area.

The lower leg 291 is hollow and is divided by wall portions 294 and 295 into three flow channels 296, 297 and 298. The ends of these flow channels are closed by a suitable closure plate. Like the walls 265, 266 and 267 of the front heat exchanger 257, the walls 294 and 295 terminate short of one end so as to provide a serpentine flow path for the coolant through the heat exchangers 258 and 259.

Continuing to refer primarily to the heat exchanger 259, one end of it is provided with a coolant inlet fitting 299. The inlet fitting 299 of the heat exchanger 259 is at the front of the snowmobile, while the corresponding inlet fitting 299 of the heat exchanger 258 is at the rear end. These fittings 299 communicate at one end of the flow channel 298.

The wall 295 that defines this flow channel terminates short of the end portion so as to provide a crossover passage 301 so that coolant that has entered one end of the channel 298 can flow transversely across to the other end of the channel 297.

The coolant then flows along the channel 297 to a point where the wall 294 terminates short of the inlet end of the channel 298. This permits the coolant to then cross over to the remaining flow channel 296 and flow back toward the opposite end. A coolant discharge fitting 302 is formed therein that permits discharge of the coolant from the respective side heat exchanger 258 or 259. The discharge fitting 302 of the heat exchanger 259 is to the rear, while the outlet 302 of the heat exchanger 258 is to the front.

Figure 21:
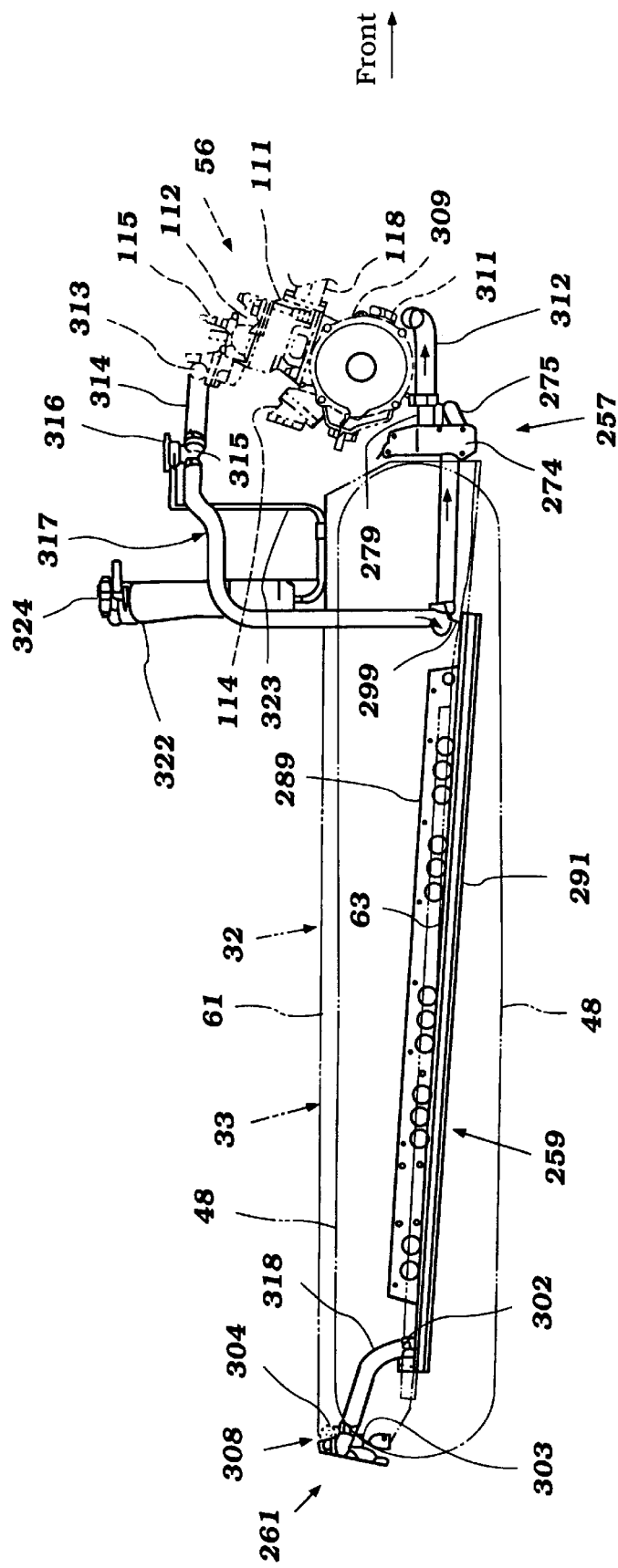
FIG. 21 is a side elevational view showing the engine and its cooling system with other portions of the snowmobile removed or shown in phantom.
Figure 22:
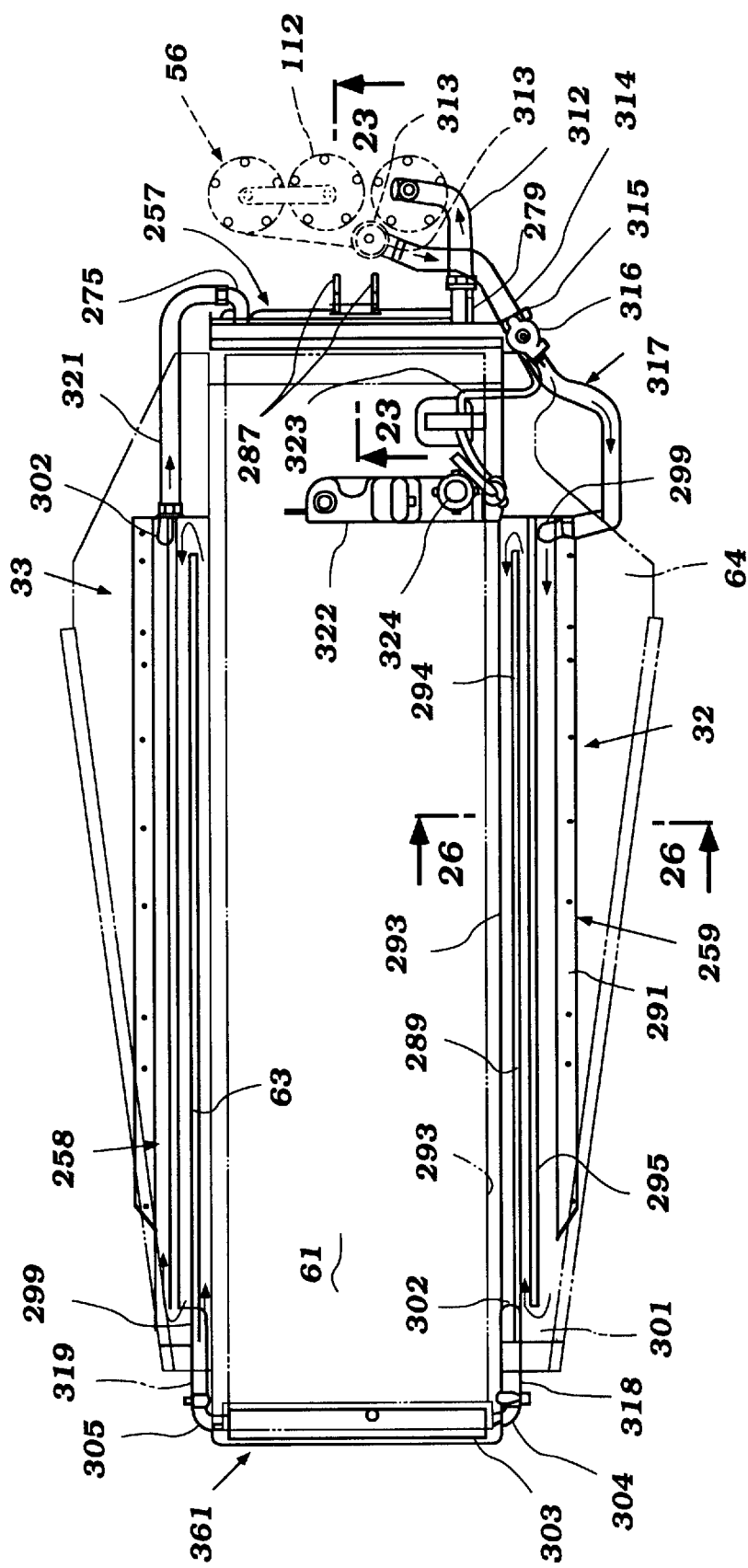
FIG. 22 is a top plan view of the same assemblage shown in FIG. 21.

The rear heat exchanger 261 is shown only in FIGS. 21 and 22. This heat exchanger 261, like the heat exchangers 257, 258 and 259, is formed of a main body portion 303 that may be formed from an aluminum extrusion and which has internal baffles so as to define a serpentine three pass flow path. This flow path begins at an inlet fitting 304 formed at the side adjacent the side heat exchanger 259. From the inlet fitting 304, the coolant flows transversely across toward the opposite side of the snowmobile.

The coolant flow then reverses direction and flows back toward the inlet side, as with the previously described heat exchangers. Finally, the flow path passes back in the same directly as the inlet, and exits through a discharge fitting 305 associated with the left-hand side of the snowmobile and adjacent the side heat exchanger 258.

These flow paths are closed by end plates 306 that are affixed to opposite ends of the extrusion 303 and which afford a means for attachment to the side walls 293 of the frame subassembly 33. As a result, this closure rigidities the rear end of this subassembly 33, and the heat exchanger 261, in fact, forms a portion of this frame subassembly.

The heat exchanger 261 is to the rear of the drive belt 48, even in the fully compressed state thereof, as shown in FIG. 21, so as to afford adequate clearance and protection. Cooling fins (not shown) may be provided on both the front and rear portions of the rear heat exchanger 61.

Referring to FIG. 1, it should be seen that the snowmobile 31 is provided with a rear bumper assembly 307 which is juxtaposed to the rear heat exchanger 261 and which will protect it. A flap 308 depends from the body in this area to further control the air flow and snow which may be thrown rearwardly by the drive belt 48.

The coolant path through the entire system will now be described by reference to FIGS. 21 and 22. The engine 56 is provided with a crankcase assembly 309 upon which a water pump 311 is mounted, and which is driven from the engine in a suitable manner. A short flexible hose 312 delivers water from the front heat exchanger outlet 279 to this water pump 311. The water is then circulated through the engine, and is discharged from a housing assembly 313, which may include a thermostat, to another short delivery hose 314. A fitting 315 is provided in this hose 314. This fitting 315 has a fill neck that is closed by a cap 316 so that coolant can be added to the system.

Another short hose 317 extends from the fitting 315 to the inlet fitting 299 of the side heat exchanger 259. After the coolant has passed through the three passes of the side heat exchanger 259, it is discharged from the discharge fitting 311 to a short connecting hose 318 into the rear heat exchanger inlet fitting 304.

The coolant then flows through the three passes of the rear heat exchanger 261 and is discharged therefrom through its outlet fitting 305. A short flexible conduit 319 connects the rear heat exchanger outlet fitting 305 with the inlet fitting 299 of the remaining side heat exchanger 258. The coolant can then flow through the three passes of this heat exchanger and be discharged from its outlet fitting 302.

The outlet fitting 302 of the side heat exchanger 258 is connected by a short flexible connecting pipe 321 to the inlet fitting 275 of the front heat exchanger 257.

Thus, it should be readily apparent that the cooling system is configured so as to provide a very large surface area for heat exchange and also a long flow path for the coolant. The heat exchangers, as already noted, also rigidify the frame assembly and perform certain additional structural functions, as in the case of the front heat exchanger 257. All of this is accomplished with very short connecting hoses, and hence, the likelihood of leakage or hose damage is substantially reduced.

An expansion tank 322 is mounted forwardly of the fuel tank 38 for overflow purposes. This expansion tank 322 receives overflow coolant through a conduit 322 that interconnects with the fitting 315 in the area of the cap 316. A fill neck closed by a cap 324 is also provided on the upper end of the expansion tank 322.

Figure 26:
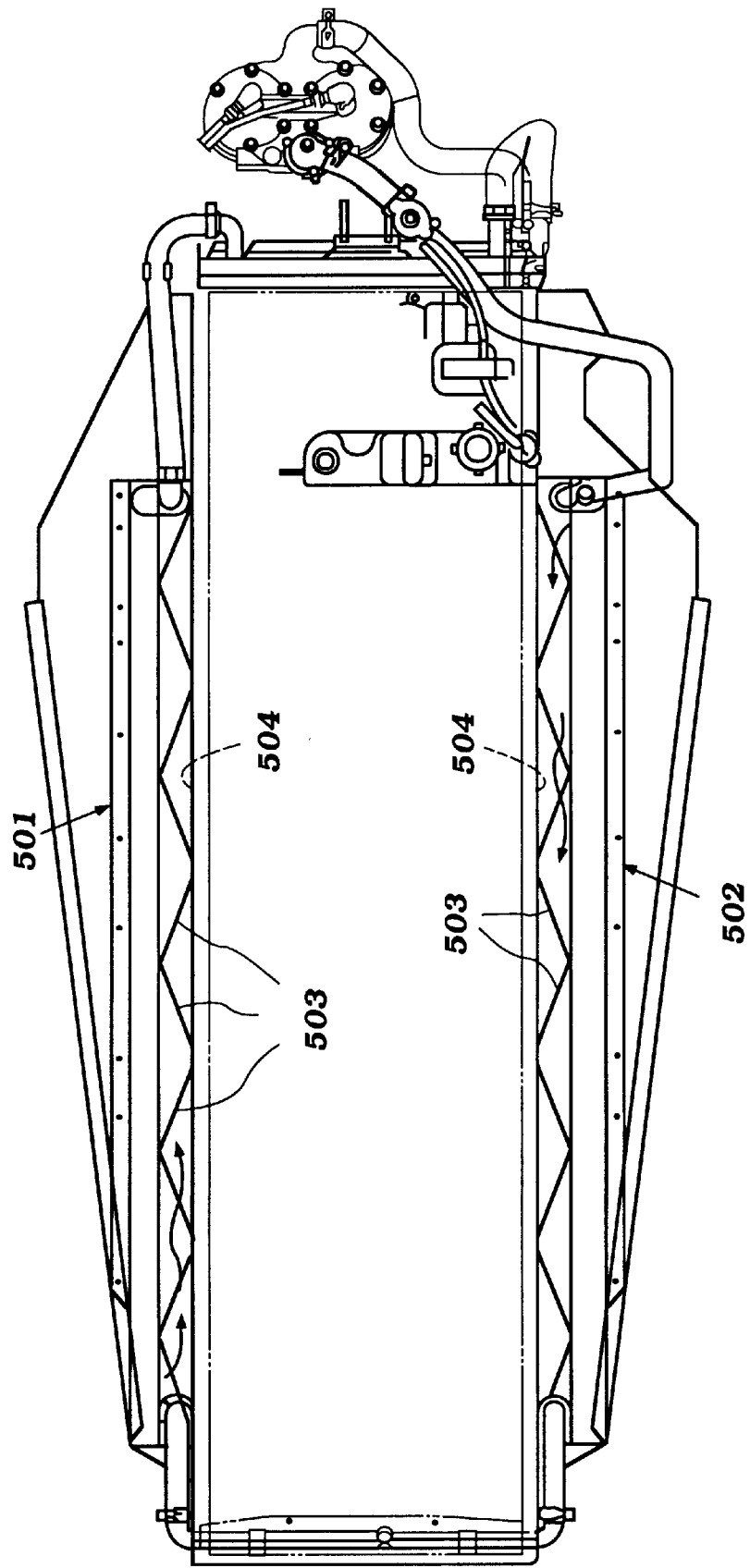
FIG. 26 is a top plan view, in part similar to FIG. 22 and shows another embodiment of the invention.

In this embodiment as thus far described, the side heat exchangers 258 and 259 have been formed from aluminum extrusions, with internal walls that define their three pass flow paths. Of course, other types of heat exchangers may be employed. FIG. 26 shows another embodiment which is basically the same as the embodiment thus far described. This embodiment, however, shows how the invention can be utilized with a two-cylinder engine, and the side heat exchangers, indicated by the reference numerals 501 and 502, are provided with internal flow paths that are defined by finned and suitable apertured baffle plates 503, to define the flow paths through their internal flow channels 504. In all other regards, this embodiment is the same as those previously described and, for that reason, further description of this embodiment is not believed to be necessary to permit those skilled in the art to practice this invention.

From the foregoing description, it should be readily apparent that the frame assembly and particularly the frame subassembly is very easy to manufacture and nevertheless provides a high strength and rigidity. The front frame subassembly also is constructed in such a way so as to facilitate installation removal of the engine and mounting of the front skis and steering assembly therefor.

Of course, the foregoing description is that of preferred embodiments of the invention, and various changes and modifications may be made without departing from the spirit and scope of the invention, as defined by the appended claims.

What is claimed is:

1. A frame assembly for a snowmobile or the like comprised of a unitary U-shaped sheet metal member having a pair of vertically extending spaced apart side wall portions joined at their lower ends by a horizontally extending joining portion, a bulkhead formed as an alloy casting spanning the forward ends of said side walls and rigidly affixed thereto, a further sheet metal member extending transversely between said side walls and rigidly affixed thereto in spaced relationship to said bulkhead for forming a cradle in which an engine can be positioned, said joining portion forming the lower part of said cradle, one of said side wall portions being formed with an opening through which the engine may be passed for installation, and a longitudinally extending portion closing the upper end of said opening.

2. A frame assembly as set forth in claim 1, wherein a pair of front steering ground-engaging elements are suspended directly from the bulkhead.

3. A frame assembly as set forth in claim 2, further including a steering assembly for steering the ground-engaging elements mounted at least in substantial part on the bulkhead.

4. A frame assembly as set forth in claim 3, wherein the steering assemblage further includes a steering shaft journaled at one end on the bulkhead.

5. A frame assembly as set forth in claim 1, wherein the bulkhead is reinforced by integral ribs formed on a rear face thereof.

6. A frame assembly as set forth in claim 1, wherein the side walls are planar and engage and are joined to like shaped surfaces of the bulkhead.

7. A frame assembly as set forth in claim 1, wherein the frame assembly comprises a front frame subassembly and further including a rear frame subassembly also comprised of a U-shaped sheet metal member rigidly affixed to the front frame assembly.

8. A frame assembly as set forth in claim 7, wherein a pair of front steering ground-engaging elements are suspended directly from the bulkhead.

9. A frame assembly as set forth in claim 8, further including a steering assembly for steering the ground-engaging elements mounted at least in substantial part on the bulkhead.

10. A frame assembly as set forth in claim 9, wherein the steering assemblage further includes a steering shaft journaled at one end on the bulkhead.

11. A frame assembly as set forth in claim 10, wherein the bulkhead is reinforced by integral ribs formed on a rear face thereof.

12. A frame assembly as set forth in claim 1, wherein the longitudinally extending portion closing the opening is detachably connected to said one side wall portion.

13. A frame assembly as set forth in claim 1, wherein both of the side wall portions are formed with an opening through which the engine may be passed for installation, the upper end of said openings being closed by longitudinally extending portions.

14. A frame assembly as set forth in claim 13, wherein only one the longitudinally extending portions closing the respective opening is detachably connected to the respective side wall portion and the other opening is closed by an integral portion of the respective side wall.

\* \* \* \* \*